US011768004B2

(12) United States Patent
Sinha et al.

(10) Patent No.: US 11,768,004 B2
(45) Date of Patent: Sep. 26, 2023

(54) HVAC DEVICE REGISTRATION IN A DISTRIBUTED BUILDING MANAGEMENT SYSTEM

(71) Applicant: Johnson Controls Tyco IP Holdings LLP, Milwaukee, WI (US)

(72) Inventors: Sudhi Sinha, Milwaukee, WI (US); Youngchoon Park, Brookfield, WI (US); Kyle Richard Gustafson, Milwaukee, WI (US); Justin J. Ploegert, Cudahy, WI (US); Erik Paulson, Madison, WI (US)

(73) Assignee: JOHNSON CONTROLS TYCO IP HOLDINGS LLP, Milwaukee, WI (US)

(*) Notice: Subject to any disclaimer, the term of this patent is extended or adjusted under 35 U.S.C. 154(b) by 0 days.

(21) Appl. No.: 15/474,746

(22) Filed: Mar. 30, 2017

(65) Prior Publication Data

US 2017/0284691 A1    Oct. 5, 2017

Related U.S. Application Data

(60) Provisional application No. 62/316,468, filed on Mar. 31, 2016.

(51) Int. Cl.
*G05B 19/042* (2006.01)
*F24F 11/58* (2018.01)
(Continued)

(52) U.S. Cl.
CPC .............. *F24F 11/64* (2018.01); *F24F 11/30* (2018.01); *F24F 11/58* (2018.01); *F24F 11/62* (2018.01);
(Continued)

(58) Field of Classification Search
CPC .... G06F 2221/0711; G05B 2219/1192; G05B 19/0426; G05B 2219/2614; H04L 9/32
See application file for complete search history.

(56) References Cited

U.S. PATENT DOCUMENTS 5,301,109 A    4/1994  Landauer et al.
5,446,677 A    8/1995  Jensen et al.
(Continued)

FOREIGN PATENT DOCUMENTS

| CN | 101415011 A | 4/2009 |
|----|-------------|--------|
| CN | 102130907 A | 7/2011 |
| CN | 102136099 A | 7/2011 |
| CN | 102136100 A | 7/2011 |
| CN | 102650876 A | 8/2012 |
| CN | 103733148 A | 4/2014 |
| CN | 104040583 A | 9/2014 |

(Continued)

OTHER PUBLICATIONS

Search Report for International Application No. PCT/US2017/025181, dated Jun. 16, 2017, 10 pages.

(Continued)

*Primary Examiner* — Kenneth M Lo
*Assistant Examiner* — Jonathan Michael Skrzycki
(74) *Attorney, Agent, or Firm* — Foley & Lardner LLP

(57) ABSTRACT

A method for registering an HVAC device in a distributed building management system (BMS). The method includes requesting a token. The token is configured to authorize a registration of the HVAC device. The method further includes receiving the token at a registration service, and receiving a unique ID associated with the HVAC device at the registration service. The method also includes registering the device into a document database of the registration service and generating a device shadow associated with the HVAC device. The method also includes storing the device shadow in the distributed BMS.

20 Claims, 13 Drawing Sheets

(51) Int. Cl.
*F24F 11/64* (2018.01)
*F24F 11/30* (2018.01)
*F24F 11/62* (2018.01)
*F24F 11/77* (2018.01)
*F24F 11/84* (2018.01)
*F24F 11/63* (2018.01)
*F24F 110/00* (2018.01)
*F24F 11/59* (2018.01)
*F24F 11/38* (2018.01)

(52) U.S. Cl.
CPC ............. *F24F 11/77* (2018.01); *F24F 11/84* (2018.01); *G05B 19/0426* (2013.01); *F24F 11/38* (2018.01); *F24F 11/59* (2018.01); *F24F 11/63* (2018.01); *F24F 2110/00* (2018.01); *G05B 2219/2614* (2013.01)

(56) References Cited

U.S. PATENT DOCUMENTS

| | | |
|---|---|---|
| 5,581,478 A | 12/1996 | Cruse et al. |
| 5,812,962 A | 9/1998 | Kovac |
| 5,960,381 A | 9/1999 | Singers et al. |
| 5,973,662 A | 10/1999 | Singers et al. |
| 6,014,612 A | 1/2000 | Larson et al. |
| 6,031,547 A | 2/2000 | Kennedy |
| 6,134,511 A | 10/2000 | Subbarao |
| 6,157,943 A | 12/2000 | Meyer |
| 6,285,966 B1 | 9/2001 | Brown et al. |
| 6,363,422 B1 | 3/2002 | Hunter et al. |
| 6,385,510 B1 | 5/2002 | Hoog et al. |
| 6,389,331 B1 | 5/2002 | Jensen et al. |
| 6,401,027 B1 | 6/2002 | Xu et al. |
| 6,437,691 B1 | 8/2002 | Sandelman et al. |
| 6,477,518 B1 | 11/2002 | Li et al. |
| 6,487,457 B1 | 11/2002 | Hull et al. |
| 6,493,755 B1 | 12/2002 | Hansen et al. |
| 6,577,323 B1 | 6/2003 | Jamieson et al. |
| 6,626,366 B2 | 9/2003 | Kayahara et al. |
| 6,646,660 B1 | 11/2003 | Patty |
| 6,704,016 B1 | 3/2004 | Oliver et al. |
| 6,732,540 B2 | 5/2004 | Sugihara et al. |
| 6,764,019 B1 | 7/2004 | Kayahara et al. |
| 6,782,385 B2 | 8/2004 | Natsumeda et al. |
| 6,813,532 B2 | 11/2004 | Eryurek et al. |
| 6,816,811 B2 | 11/2004 | Seem |
| 6,823,680 B2 | 11/2004 | Jayanth |
| 6,826,454 B2 | 11/2004 | Sulfstede |
| 6,865,511 B2 | 3/2005 | Frerichs et al. |
| 6,925,338 B2 | 8/2005 | Eryurek et al. |
| 6,986,138 B1 | 1/2006 | Sakaguchi et al. |
| 7,031,880 B1 | 4/2006 | Seem et al. |
| 7,401,057 B2 | 7/2008 | Eder |
| 7,552,467 B2 | 6/2009 | Lindsay |
| 7,627,544 B2 | 12/2009 | Chkodrov et al. |
| 7,818,249 B2 | 10/2010 | Lovejoy et al. |
| 7,889,051 B1 | 2/2011 | Billig et al. |
| 7,996,488 B1 | 8/2011 | Casabella et al. |
| 8,078,330 B2 | 12/2011 | Brickfield et al. |
| 8,104,044 B1 | 1/2012 | Scofield et al. |
| 8,229,470 B1 | 7/2012 | Ranjan et al. |
| 8,401,991 B2 | 3/2013 | Wu et al. |
| 8,495,745 B1 | 7/2013 | Schrecker et al. |
| 8,516,016 B2 | 8/2013 | Park et al. |
| 8,532,808 B2 | 9/2013 | Drees et al. |
| 8,532,839 B2 | 9/2013 | Drees et al. |
| 8,600,556 B2 | 12/2013 | Nesler et al. |
| 8,635,182 B2 | 1/2014 | Mackay |
| 8,682,921 B2 | 3/2014 | Park et al. |
| 8,731,724 B2 | 5/2014 | Drees et al. |
| 8,737,334 B2 | 5/2014 | Ahn et al. |
| 8,738,334 B2 | 5/2014 | Jiang et al. |
| 8,751,487 B2 | 6/2014 | Byrne et al. |
| 8,788,097 B2 | 7/2014 | Drees et al. |
| 8,805,995 B1 | 8/2014 | Oliver |
| 8,843,238 B2 | 9/2014 | Wenzel et al. |
| 8,874,071 B2 | 10/2014 | Sherman et al. |
| 8,941,465 B2 | 1/2015 | Pineau et al. |
| 8,990,127 B2 | 3/2015 | Taylor |
| 9,070,113 B2 | 6/2015 | Shafiee et al. |
| 9,094,407 B1 * | 7/2015 | Matthieu ................. H04W 4/70 |
| 9,116,978 B2 | 8/2015 | Park et al. |
| 9,185,095 B1 | 11/2015 | Moritz et al. |
| 9,189,527 B2 | 11/2015 | Park et al. |
| 9,196,009 B2 | 11/2015 | Drees et al. |
| 9,229,966 B2 | 1/2016 | Aymeloglu et al. |
| 9,286,582 B2 | 3/2016 | Drees et al. |
| 9,311,807 B2 | 4/2016 | Schultz et al. |
| 9,344,751 B1 | 5/2016 | Ream et al. |
| 9,354,968 B2 | 5/2016 | Wenzel et al. |
| 9,396,015 B2 * | 7/2016 | Sundaresan ......... G06F 9/45558 |
| 9,507,686 B2 | 11/2016 | Horn et al. |
| 9,524,594 B2 | 12/2016 | Ouyang et al. |
| 9,558,196 B2 | 1/2017 | Johnston et al. |
| 9,652,813 B2 | 5/2017 | Gifford et al. |
| 9,753,455 B2 | 9/2017 | Drees |
| 9,800,646 B1 * | 10/2017 | Stamatakis ........... H04L 67/025 |
| 9,811,249 B2 | 11/2017 | Chen et al. |
| 9,838,844 B2 | 12/2017 | Emeis et al. |
| 9,886,478 B2 | 2/2018 | Mukherjee |
| 9,948,359 B2 | 4/2018 | Horton |
| 10,055,114 B2 | 8/2018 | Shah et al. |
| 10,055,206 B2 | 8/2018 | Park et al. |
| 10,116,461 B2 | 10/2018 | Fairweather et al. |
| 10,169,454 B2 | 1/2019 | Ait-Mokhtar et al. |
| 10,171,586 B2 | 1/2019 | Shaashua et al. |
| 10,187,258 B2 | 1/2019 | Nagesh et al. |
| 10,416,202 B1 * | 9/2019 | Contario ................... H02J 4/00 |
| 10,514,963 B2 | 12/2019 | Shrivastava et al. |
| 10,515,098 B2 | 12/2019 | Park et al. |
| 10,534,326 B2 | 1/2020 | Sridharan et al. |
| 10,536,295 B2 | 1/2020 | Fairweather et al. |
| 10,705,492 B2 | 7/2020 | Harvey |
| 10,708,078 B2 | 7/2020 | Harvey |
| 10,845,771 B2 | 11/2020 | Harvey |
| 10,854,194 B2 | 12/2020 | Park et al. |
| 10,862,928 B1 | 12/2020 | Badawy et al. |
| 10,921,760 B2 | 2/2021 | Harvey |
| 10,921,972 B2 | 2/2021 | Park et al. |
| 10,969,133 B2 | 4/2021 | Harvey |
| 10,986,121 B2 | 4/2021 | Stockdale et al. |
| 11,016,998 B2 | 5/2021 | Park et al. |
| 11,024,292 B2 | 6/2021 | Park et al. |
| 11,038,709 B2 | 6/2021 | Park et al. |
| 11,070,390 B2 | 7/2021 | Park et al. |
| 11,073,976 B2 | 7/2021 | Park et al. |
| 11,108,587 B2 | 8/2021 | Park et al. |
| 11,113,295 B2 | 9/2021 | Park et al. |
| 11,229,138 B1 | 1/2022 | Harvey et al. |
| 11,314,726 B2 | 4/2022 | Park et al. |
| 11,314,788 B2 | 4/2022 | Park et al. |
| 2002/0010562 A1 | 1/2002 | Schleiss et al. |
| 2002/0016639 A1 | 2/2002 | Smith et al. |
| 2002/0059229 A1 | 5/2002 | Natsumeda et al. |
| 2002/0123864 A1 | 9/2002 | Eryurek et al. |
| 2002/0147506 A1 | 10/2002 | Eryurek et al. |
| 2002/0177909 A1 | 11/2002 | Fu et al. |
| 2003/0005486 A1 | 1/2003 | Ridolfo et al. |
| 2003/0014130 A1 | 1/2003 | Grumelart |
| 2003/0073432 A1 | 4/2003 | Meade, II |
| 2003/0158704 A1 | 8/2003 | Triginai et al. |
| 2003/0171851 A1 | 9/2003 | Brickfield et al. |
| 2003/0200059 A1 | 10/2003 | Ignatowski et al. |
| 2004/0068390 A1 | 4/2004 | Saunders |
| 2004/0128314 A1 | 7/2004 | Katibah et al. |
| 2004/0133314 A1 | 7/2004 | Ehlers et al. |
| 2004/0199360 A1 | 10/2004 | Friman et al. |
| 2005/0055308 A1 | 3/2005 | Meyer et al. |
| 2005/0108262 A1 | 5/2005 | Fawcett et al. |
| 2005/0154494 A1 | 7/2005 | Ahmed |
| 2005/0278703 A1 | 12/2005 | Lo et al. |
| 2005/0283337 A1 | 12/2005 | Sayal |

(56) References Cited

U.S. PATENT DOCUMENTS

| | | | |
|---|---|---|---|
| 2006/0067209 A1* | 3/2006 | Sheehan | H04L 29/08846 370/216 |
| 2006/0095521 A1 | 5/2006 | Patinkin | |
| 2006/0140207 A1 | 6/2006 | Eschbach et al. | |
| 2006/0184479 A1 | 8/2006 | Levine | |
| 2006/0200476 A1 | 9/2006 | Gottumukkala et al. | |
| 2006/0265751 A1 | 11/2006 | Cosquer et al. | |
| 2006/0271589 A1 | 11/2006 | Horowitz et al. | |
| 2007/0028179 A1 | 2/2007 | Levin et al. | |
| 2007/0203693 A1 | 8/2007 | Estes | |
| 2007/0242688 A1* | 10/2007 | McFarland | H04L 12/2803 370/445 |
| 2007/0261062 A1 | 11/2007 | Bansal et al. | |
| 2007/0273497 A1 | 11/2007 | Kuroda et al. | |
| 2007/0273610 A1 | 11/2007 | Baillot | |
| 2008/0034425 A1 | 2/2008 | Overcash et al. | |
| 2008/0094230 A1 | 4/2008 | Mock et al. | |
| 2008/0097816 A1 | 4/2008 | Freire et al. | |
| 2008/0186160 A1 | 8/2008 | Kim et al. | |
| 2008/0249756 A1 | 10/2008 | Chaisuparasmikul | |
| 2008/0252723 A1 | 10/2008 | Park | |
| 2008/0281472 A1 | 11/2008 | Podgorny et al. | |
| 2009/0195349 A1 | 8/2009 | Frader-Thompson et al. | |
| 2010/0045439 A1 | 2/2010 | Tak et al. | |
| 2010/0058248 A1 | 3/2010 | Park | |
| 2010/0131533 A1 | 5/2010 | Ortiz | |
| 2010/0274366 A1 | 10/2010 | Fata et al. | |
| 2010/0281387 A1 | 11/2010 | Holland et al. | |
| 2010/0286937 A1 | 11/2010 | Hedley et al. | |
| 2010/0324962 A1 | 12/2010 | Nesler et al. | |
| 2011/0015802 A1 | 1/2011 | Imes | |
| 2011/0047418 A1 | 2/2011 | Drees et al. | |
| 2011/0061015 A1 | 3/2011 | Drees et al. | |
| 2011/0071685 A1 | 3/2011 | Huneycutt et al. | |
| 2011/0077950 A1 | 3/2011 | Hughston | |
| 2011/0087650 A1 | 4/2011 | Mackay et al. | |
| 2011/0087988 A1 | 4/2011 | Ray et al. | |
| 2011/0088000 A1 | 4/2011 | Mackay | |
| 2011/0125737 A1 | 5/2011 | Pothering et al. | |
| 2011/0137853 A1 | 6/2011 | Mackay | |
| 2011/0153603 A1 | 6/2011 | Adiba et al. | |
| 2011/0154363 A1 | 6/2011 | Karmarkar | |
| 2011/0157357 A1 | 6/2011 | Weisensale et al. | |
| 2011/0178977 A1 | 7/2011 | Drees | |
| 2011/0191343 A1 | 8/2011 | Heaton et al. | |
| 2011/0205022 A1 | 8/2011 | Cavallaro et al. | |
| 2011/0218777 A1 | 9/2011 | Chen et al. | |
| 2012/0011126 A1 | 1/2012 | Park et al. | |
| 2012/0011141 A1 | 1/2012 | Park et al. | |
| 2012/0022698 A1 | 1/2012 | Mackay | |
| 2012/0062577 A1 | 3/2012 | Nixon | |
| 2012/0064923 A1 | 3/2012 | Imes et al. | |
| 2012/0083930 A1 | 4/2012 | Ilic et al. | |
| 2012/0100825 A1 | 4/2012 | Sherman et al. | |
| 2012/0101637 A1 | 4/2012 | Imes et al. | |
| 2012/0135759 A1 | 5/2012 | Imes et al. | |
| 2012/0136485 A1 | 5/2012 | Weber et al. | |
| 2012/0158633 A1 | 6/2012 | Eder | |
| 2012/0259583 A1 | 10/2012 | Noboa et al. | |
| 2012/0272228 A1 | 10/2012 | Marndi et al. | |
| 2012/0278051 A1 | 11/2012 | Jiang et al. | |
| 2013/0007063 A1 | 1/2013 | Kalra et al. | |
| 2013/0038430 A1 | 2/2013 | Blower et al. | |
| 2013/0038707 A1 | 2/2013 | Cunningham et al. | |
| 2013/0060820 A1 | 3/2013 | Bulusu et al. | |
| 2013/0086497 A1 | 4/2013 | Ambuhl et al. | |
| 2013/0097706 A1 | 4/2013 | Titonis et al. | |
| 2013/0103221 A1 | 4/2013 | Raman et al. | |
| 2013/0167035 A1 | 6/2013 | Imes et al. | |
| 2013/0170710 A1 | 7/2013 | Kuoch et al. | |
| 2013/0204836 A1 | 8/2013 | Choi et al. | |
| 2013/0214902 A1 | 8/2013 | Pineau et al. | |
| 2013/0246916 A1 | 9/2013 | Reimann et al. | |
| 2013/0247205 A1 | 9/2013 | Schrecker et al. | |
| 2013/0262035 A1 | 10/2013 | Mills | |
| 2013/0275174 A1 | 10/2013 | Bennett et al. | |
| 2013/0275908 A1 | 10/2013 | Reichard | |
| 2013/0297050 A1 | 11/2013 | Reichard et al. | |
| 2013/0298244 A1 | 11/2013 | Kumar et al. | |
| 2013/0331995 A1 | 12/2013 | Rosen | |
| 2014/0032506 A1 | 1/2014 | Hoey et al. | |
| 2014/0059483 A1 | 2/2014 | Mairs et al. | |
| 2014/0081652 A1 | 3/2014 | Klindworth | |
| 2014/0135952 A1 | 5/2014 | Maehara | |
| 2014/0152651 A1 | 6/2014 | Chen et al. | |
| 2014/0172184 A1 | 6/2014 | Schmidt et al. | |
| 2014/0189861 A1 | 7/2014 | Gupta et al. | |
| 2014/0207282 A1 | 7/2014 | Angle et al. | |
| 2014/0222813 A1 | 8/2014 | Yang et al. | |
| 2014/0258052 A1 | 9/2014 | Khuti et al. | |
| 2014/0269614 A1 | 9/2014 | Maguire et al. | |
| 2014/0277765 A1 | 9/2014 | Karimi et al. | |
| 2014/0278461 A1 | 9/2014 | Artz | |
| 2014/0327555 A1 | 11/2014 | Sager et al. | |
| 2015/0019174 A1 | 1/2015 | Kiff et al. | |
| 2015/0042240 A1 | 2/2015 | Aggarwal et al. | |
| 2015/0105917 A1 | 4/2015 | Sasaki et al. | |
| 2015/0113592 A1* | 4/2015 | Curtis | H04L 63/0823 726/2 |
| 2015/0145468 A1 | 5/2015 | Ma et al. | |
| 2015/0156031 A1 | 6/2015 | Fadell et al. | |
| 2015/0168931 A1 | 6/2015 | Jin | |
| 2015/0172300 A1 | 6/2015 | Cochenour | |
| 2015/0178421 A1 | 6/2015 | Borrelli et al. | |
| 2015/0185261 A1 | 7/2015 | Frader-Thompson et al. | |
| 2015/0186777 A1 | 7/2015 | Lecue et al. | |
| 2015/0202962 A1 | 7/2015 | Habashima et al. | |
| 2015/0204563 A1 | 7/2015 | Imes et al. | |
| 2015/0235267 A1 | 8/2015 | Steube et al. | |
| 2015/0237071 A1* | 8/2015 | Maher | H04L 63/20 726/1 |
| 2015/0241895 A1 | 8/2015 | Lu et al. | |
| 2015/0244730 A1 | 8/2015 | Vu et al. | |
| 2015/0244732 A1 | 8/2015 | Golshan et al. | |
| 2015/0261863 A1 | 9/2015 | Dey et al. | |
| 2015/0263900 A1 | 9/2015 | Polyakov et al. | |
| 2015/0286969 A1 | 10/2015 | Warner et al. | |
| 2015/0295796 A1 | 10/2015 | Hsiao et al. | |
| 2015/0304193 A1 | 10/2015 | Ishii et al. | |
| 2015/0316918 A1 | 11/2015 | Schleiss et al. | |
| 2015/0324422 A1 | 11/2015 | Elder | |
| 2015/0341212 A1 | 11/2015 | Hsiao et al. | |
| 2015/0348417 A1 | 12/2015 | Ignaczak et al. | |
| 2015/0379080 A1 | 12/2015 | Jochimski | |
| 2016/0011753 A1 | 1/2016 | Mcfarland et al. | |
| 2016/0033946 A1 | 2/2016 | Zhu et al. | |
| 2016/0035246 A1 | 2/2016 | Curtis | |
| 2016/0044719 A1* | 2/2016 | Sidhu | H04W 76/10 370/329 |
| 2016/0065601 A1 | 3/2016 | Gong et al. | |
| 2016/0070736 A1 | 3/2016 | Swan et al. | |
| 2016/0078229 A1 | 3/2016 | Gong et al. | |
| 2016/0086045 A1 | 3/2016 | Roberts et al. | |
| 2016/0090839 A1 | 3/2016 | Stolarczyk | |
| 2016/0119434 A1 | 4/2016 | Dong et al. | |
| 2016/0127712 A1 | 5/2016 | Alfredsson et al. | |
| 2016/0139752 A1 | 5/2016 | Shim et al. | |
| 2016/0163186 A1 | 6/2016 | Davidson et al. | |
| 2016/0170390 A1 | 6/2016 | Xie et al. | |
| 2016/0171862 A1 | 6/2016 | Das et al. | |
| 2016/0173816 A1 | 6/2016 | Huenerfauth et al. | |
| 2016/0179315 A1 | 6/2016 | Sarao et al. | |
| 2016/0179342 A1 | 6/2016 | Sarao et al. | |
| 2016/0179990 A1 | 6/2016 | Sarao et al. | |
| 2016/0195856 A1 | 7/2016 | Spero | |
| 2016/0212165 A1 | 7/2016 | Singla et al. | |
| 2016/0234186 A1* | 8/2016 | Leblond | H04L 67/34 |
| 2016/0239660 A1 | 8/2016 | Azvine et al. | |
| 2016/0239756 A1 | 8/2016 | Aggour et al. | |
| 2016/0285874 A1* | 9/2016 | Smith | H04L 61/2589 |
| 2016/0313751 A1 | 10/2016 | Risbeck et al. | |
| 2016/0313752 A1 | 10/2016 | Przybylski | |
| 2016/0313902 A1 | 10/2016 | Hill et al. | |
| 2016/0350364 A1 | 12/2016 | Anicic et al. | |

(56) References Cited

U.S. PATENT DOCUMENTS

| | | |
|---|---|---|
| 2016/0357828 A1 | 12/2016 | Tobin et al. |
| 2016/0358432 A1 | 12/2016 | Branscomb et al. |
| 2016/0363336 A1 | 12/2016 | Roth et al. |
| 2016/0370258 A1 | 12/2016 | Perez |
| 2016/0378306 A1 | 12/2016 | Kresl et al. |
| 2016/0379326 A1 | 12/2016 | Chan-Gove et al. |
| 2017/0006135 A1 | 1/2017 | Siebel |
| 2017/0011318 A1 | 1/2017 | Vigano et al. |
| 2017/0017221 A1 | 1/2017 | Lamparter et al. |
| 2017/0039255 A1 | 2/2017 | Raj et al. |
| 2017/0052536 A1 | 2/2017 | Warner et al. |
| 2017/0053441 A1 | 2/2017 | Nadumane et al. |
| 2017/0063894 A1 | 3/2017 | Muddu et al. |
| 2017/0068409 A1 | 3/2017 | Nair |
| 2017/0070775 A1 | 3/2017 | Taxier et al. |
| 2017/0075984 A1 | 3/2017 | Deshpande et al. |
| 2017/0084168 A1 | 3/2017 | Janchookiat |
| 2017/0090437 A1 | 3/2017 | Veeramani et al. |
| 2017/0093700 A1 | 3/2017 | Gilley et al. |
| 2017/0098086 A1 | 4/2017 | Hoernecke et al. |
| 2017/0103327 A1 | 4/2017 | Penilla et al. |
| 2017/0103403 A1 | 4/2017 | Chu et al. |
| 2017/0123389 A1 | 5/2017 | Baez et al. |
| 2017/0134415 A1 | 5/2017 | Muddu et al. |
| 2017/0177715 A1 | 6/2017 | Chang et al. |
| 2017/0180147 A1 | 6/2017 | Brandman et al. |
| 2017/0188216 A1 | 6/2017 | Koskas et al. |
| 2017/0212482 A1 | 7/2017 | Boettcher et al. |
| 2017/0212668 A1 | 7/2017 | Shah et al. |
| 2017/0220641 A1 | 8/2017 | Chi et al. |
| 2017/0230930 A1 | 8/2017 | Frey |
| 2017/0235817 A1 | 8/2017 | Deodhar et al. |
| 2017/0251182 A1 | 8/2017 | Siminoff et al. |
| 2017/0270124 A1 | 9/2017 | Nagano et al. |
| 2017/0277769 A1 | 9/2017 | Pasupathy et al. |
| 2017/0278003 A1 | 9/2017 | Liu |
| 2017/0294132 A1 | 10/2017 | Colmenares |
| 2017/0315522 A1 | 11/2017 | Kwon et al. |
| 2017/0315697 A1 | 11/2017 | Jacobson et al. |
| 2017/0322534 A1 | 11/2017 | Sinha et al. |
| 2017/0323389 A1 | 11/2017 | Vavrasek |
| 2017/0329289 A1 | 11/2017 | Kohn et al. |
| 2017/0336770 A1 | 11/2017 | Macmillan |
| 2017/0345287 A1 | 11/2017 | Fuller et al. |
| 2017/0351957 A1 | 12/2017 | Lecue et al. |
| 2017/0357225 A1 | 12/2017 | Asp et al. |
| 2017/0357490 A1 | 12/2017 | Park et al. |
| 2017/0357908 A1 | 12/2017 | Cabadi et al. |
| 2018/0012159 A1 | 1/2018 | Kozloski et al. |
| 2018/0013579 A1 | 1/2018 | Fairweather et al. |
| 2018/0024520 A1 | 1/2018 | Sinha et al. |
| 2018/0039238 A1 | 2/2018 | Gartner et al. |
| 2018/0048485 A1 | 2/2018 | Pelton et al. |
| 2018/0069932 A1 | 3/2018 | Tiwari et al. |
| 2018/0114140 A1 | 4/2018 | Chen et al. |
| 2018/0137288 A1 | 5/2018 | Polyakov |
| 2018/0157930 A1 | 6/2018 | Rutschman et al. |
| 2018/0162400 A1 | 6/2018 | Abdar |
| 2018/0176241 A1 | 6/2018 | Manadhata et al. |
| 2018/0198627 A1 | 7/2018 | Mullins |
| 2018/0203961 A1 | 7/2018 | Aisu et al. |
| 2018/0239982 A1 | 8/2018 | Rutschman et al. |
| 2018/0275625 A1 | 9/2018 | Park et al. |
| 2018/0276962 A1 | 9/2018 | Butler et al. |
| 2018/0292797 A1 | 10/2018 | Lamparter et al. |
| 2018/0336785 A1 | 11/2018 | Ghannam et al. |
| 2018/0359111 A1 | 12/2018 | Harvey |
| 2018/0364654 A1 | 12/2018 | Locke et al. |
| 2019/0005025 A1 | 1/2019 | Malabarba |
| 2019/0013023 A1 | 1/2019 | Pourmohammad et al. |
| 2019/0025771 A1 | 1/2019 | Park et al. |
| 2019/0037135 A1 | 1/2019 | Hedge |
| 2019/0042988 A1 | 2/2019 | Brown et al. |
| 2019/0088106 A1 | 3/2019 | Grundstrom |
| 2019/0094824 A1 | 3/2019 | Xie et al. |
| 2019/0096217 A1 | 3/2019 | Pourmohammad et al. |
| 2019/0102840 A1 | 4/2019 | Perl et al. |
| 2019/0138512 A1 | 5/2019 | Pourmohammad et al. |
| 2019/0147883 A1 | 5/2019 | Mellenthin et al. |
| 2019/0158309 A1 | 5/2019 | Park et al. |
| 2019/0163152 A1 | 5/2019 | Worrall et al. |
| 2019/0268178 A1 | 8/2019 | Fairweather et al. |
| 2019/0310979 A1 | 10/2019 | Masuzaki et al. |
| 2020/0226156 A1 | 7/2020 | Borra et al. |
| 2020/0285203 A1 | 9/2020 | Thakur et al. |
| 2021/0042299 A1 | 2/2021 | Migliori |
| 2021/0381711 A1 | 12/2021 | Harvey et al. |
| 2021/0381712 A1 | 12/2021 | Harvey et al. |
| 2021/0382445 A1 | 12/2021 | Harvey et al. |
| 2021/0383041 A1 | 12/2021 | Harvey et al. |
| 2021/0383042 A1 | 12/2021 | Harvey et al. |
| 2021/0383200 A1 | 12/2021 | Harvey et al. |
| 2021/0383219 A1 | 12/2021 | Harvey et al. |
| 2021/0383235 A1 | 12/2021 | Harvey et al. |
| 2021/0383236 A1 | 12/2021 | Harvey et al. |
| 2022/0066402 A1 | 3/2022 | Harvey et al. |
| 2022/0066405 A1 | 3/2022 | Harvey |
| 2022/0066432 A1 | 3/2022 | Harvey et al. |
| 2022/0066434 A1 | 3/2022 | Harvey et al. |
| 2022/0066528 A1 | 3/2022 | Harvey et al. |
| 2022/0066722 A1 | 3/2022 | Harvey et al. |
| 2022/0066754 A1 | 3/2022 | Harvey et al. |
| 2022/0066761 A1 | 3/2022 | Harvey et al. |
| 2022/0067226 A1 | 3/2022 | Harvey et al. |
| 2022/0067227 A1 | 3/2022 | Harvey et al. |
| 2022/0067230 A1 | 3/2022 | Harvey et al. |
| 2022/0069863 A1 | 3/2022 | Harvey et al. |
| 2022/0070293 A1 | 3/2022 | Harvey et al. |
| 2022/0138684 A1 | 5/2022 | Harvey |
| 2022/0215264 A1 | 7/2022 | Harvey et al. |
| 2023/0010757 A1 | 1/2023 | Preciado |

FOREIGN PATENT DOCUMENTS

| | | |
|---|---|---|
| CN | 104113549 A | 10/2014 |
| CN | 104603832 A | 5/2015 |
| CN | 104919484 A | 9/2015 |
| CN | 105243313 A | 1/2016 |
| CN | 105323072 A | 2/2016 |
| CN | 106204392 A | 12/2016 |
| CN | 106406806 A | 2/2017 |
| CN | 106960269 A | 7/2017 |
| CN | 107147639 A1 | 9/2017 |
| CN | 107598928 A | 1/2018 |
| EP | 2 528 033 A1 | 11/2012 |
| EP | 3 324 306 A1 | 5/2018 |
| JP | H10-049552 A | 2/1998 |
| JP | 2003-162573 A | 6/2003 |
| JP | 2007-013522 A | 1/2007 |
| JP | 4073946 B1 | 4/2008 |
| JP | 2008-107930 A | 5/2008 |
| JP | 2013-152618 A | 8/2013 |
| JP | 2014-044457 A | 3/2014 |
| KR | 2016/0102923 A | 8/2016 |
| WO | WO-2009/020158 A1 | 2/2009 |
| WO | WO-2011/100255 A2 | 8/2011 |
| WO | WO-2013/050333 A1 | 4/2013 |
| WO | WO-2015/106702 A1 | 7/2015 |
| WO | WO-2015/145648 A1 | 10/2015 |
| WO | WO-2017/035536 A1 | 3/2017 |
| WO | WO-2017/192422 A1 | 11/2017 |
| WO | WO-2017/194244 A1 | 11/2017 |
| WO | WO-2017/205330 A1 | 11/2017 |
| WO | WO-2017/213918 A1 | 12/2017 |

OTHER PUBLICATIONS

Girau et al., A Cloud-Based Platform of the Social Internet of Things, Proceedings Int'l Conf. Cyber Physical Systems, IoT and Sensors Networks, 2015, 12 pages.

Lee et al., Network Configuration Technique for Home Appliances Based on LnCP, IEEE Transactions Consumer Electronics, vol. 49, No. 2, pp. 367-374, 2003, 8 pages.

(56) References Cited

OTHER PUBLICATIONS

Sriskanthan et al., Bluetooth Based Home Automation System, Microprocessors and Microsystems, vol. 26, pp. 281-289, 2002, 9 pages.
Valtchev et al., Service Gateway Architecture for a Smart Home, IEEE Communications Magazine, Apr. 2002, 7 pages.
First Office Action on CN 201780032138.1, dated Mar. 10, 2021, 19 pages with English language machine translation.
Chinese Office Action on CN Appl. No. 201780032138.1 dated Dec. 6, 2021 (17 pages with English language translation).
Balaji et al., "Brick: Metadata schema for portable smart building applications," Applied Energy, 2018 (20 pages).
Balaji et al., "Brick: Metadata schema for portable smart building applications," Applied Energy, Sep. 15, 2018, 3 pages, (Abstract).
Balaji et al., "Demo Abstract: Portable Queries Using the Brick Schema for Building Applications," BuildSys '16, Palo Alto, CA, USA, Nov. 16-17, 2016 (2 pages).
Balaji, B. et al., "Brick: Towards a Unified Metadata Schema For Buildings." BuildSys '16, Palo Alto, CA, USA, Nov. 16-17, 2016 (10 pages).
Bhattacharya et al., "Short Paper: Analyzing Metadata Schemas for Buildings—The Good, The Bad and The Ugly," BuildSys '15, Seoul, South Korea, Nov. 4-5, 2015 (4 pages).
Bhattacharya, A., "Enabling Scalable Smart-Building Analytics," Electrical Engineering and Computer Sciences, University of California at Berkeley, Technical Report No. UCB/EECS-2016-201, Dec. 15, 2016 (121 pages).
Brick, "Brick Schema: Building Blocks for Smart Buildings," URL: chrome-extension://efaidnbmnnnibpcajpcglclefindmkaj/https://www.memoori.com/wp-content/uploads/2016/06/Brick_Schema_Whitepaper.pdf, Mar. 2019 (17 pages).
Brick, "Brick: Towards a Unified Metadata Schema For Buildings," URL: chrome-extension://efaidnbmnnnibpcajpcglclefindmkaj/https://brickschema.org/papers/Brick_BuildSys_Presentation.pdf, Presented at BuildSys '16, Nov. 2016 (46 pages).
Brick, "Metadata Schema for Buildings," URL: https://brickschema.org/docs/Brick-Leaflet.pdf, retrieved from internet Dec. 24, 2019 (3 pages).
Chinese Office Action on CN Appl. No. 201780003995.9 dated Apr. 8, 2021 (21 pages with English language translation).
Chinese Office Action on CN Appl. No. 201780032138.1 dated Jun. 22, 2022 (7 pages).
Chinese Office action on CN Appl. No. 201780043400.2 dated Apr. 25, 2021 (15 pages with English language translation).
Curry, E. et al., "Linking building data in the cloud: Integrating cross-domain building data using linked data." Advanced Engineering Informatics, 2013, 27 (pp. 206-219).
Digital Platform Litigation Documents Part 1, includes cover letter, dismissal of case DDE-1-21-cv-01796, IPR2023-00022 (documents filed Jan. 26, 2023-Oct. 7, 2022), and IPR2023-00085 (documents filed Jan. 26, 2023-Oct. 20, 2022) (748 pages total).
Digital Platform Litigation Documents Part 10, includes DDE-1-21-cv-01796 (documents filed Nov. 1, 2022-Dec. 22, 2021 (1795 pages total).
Digital Platform Litigation Documents Part 2, includes IPR2023-00085 (documents filed Oct. 20, 22) (172 pages total).
Digital Platform Litigation Documents Part 3, includes IPR2023-00085 (documents filed Oct. 20, 2022) and IPR2023-00170 (documents filed Nov. 28, 2022-Nov. 7, 2022) (397 pages total).
Digital Platform Litigation Documents Part 4, includes IPR2023-00170 (documents filed Nov. 7, 2022) and IPR2023-00217 (documents filed Jan. 18, 2023-Nov. 15, 2022) (434 pages total).
Digital Platform Litigation Documents Part 5, includes IPR2023-00217 (documents filed Nov. 15, 2022) and IPR2023-00257 (documents filed Jan. 25, 2023-Nov. 23, 2022) (316 pages total).
Digital Platform Litigation Documents Part 6, includes IPR2023-00257 (documents filed Nov. 23, 2022) and IPR 2023-00346 (documents filed Jan. 3, 2023-Dec. 13, 2022) (295 pages total).
Digital Platform Litigation Documents Part 7, includes IPR 2023-00346 (documents filed Dec. 13, 2022) and IPR2023-00347 (documents filed Jan. 3, 2023-Dec. 13, 2022) (217 pages total).
Digital Platform Litigation Documents Part 8, includes IPR2023-00347 (documents filed Dec. 13, 2022), EDTX-2-22-cv-00243 (documents filed Sep. 20, 2022-Jun. 29, 2022), and DDE-1-21-cv-01796 (documents filed Feb. 3, 2023-Jan. 10, 2023 (480 pages total).
Digital Platform Litigation Documents Part 9, includes DDE-1-21-cv-01796 (documents filed Jan. 10, 2023-Nov. 1, 2022 (203 pages total).
El Kaed, C et al., "Building management insights driven by a multi-system semantic representation approach," 2016 IEEE 3rd World Forum on Internet of Things (WF-IoT), Dec. 12-14, 2016, (pp. 520-525).
Ellis, C et al., "Creating a room connectivity graph of a building from per-room sensor units." BuildSys '12, Toronto, ON, Canada, Nov. 6, 2012 (7 pages).
Extended European Search Report on EP Application No. 18196948.6 dated Apr. 10, 2019 (9 pages).
Fierro et al., "Beyond a House of Sticks: Formalizing Metadata Tags with Brick," BuildSys '19, New York, NY, USA, Nov. 13-14, 2019 (10 pages).
Fierro et al., "Dataset: An Open Dataset and Collection Tool for BMS Point Labels," DATA'19, New York, NY, USA, Nov. 10, 2019 (3 pages).
Fierro et al., "Design and Analysis of a Query Processor for Brick," ACM Transactions on Sensor Networks, Jan. 2018, vol. 1, No. 1, art. 1 (25 pages).
Fierro et al., "Design and Analysis of a Query Processor for Brick," BuildSys '17, Delft, Netherlands, Nov. 8-9, 2017 (10 pages).
Fierro et al., "Mortar: An Open Testbed for Portable Building Analytics," BuildSys '18, Shenzhen, China, Nov. 7-8, 2018 (10 pages).
Fierro et al., "Why Brick is a Game Changer for Smart Buildings," URL: https://brickschema.org/papers/Brick_Memoori_Webinar_Presentation.pdf, Memoori Webinar, 2019 (67 pages).
Fierro, "Writing Portable Building Analytics with the Brick Metadata Schema," UC Berkeley, ACM E-Energy, 2019 (39 pages).
Fierro, G., "Design of an Effective Ontology and Query Processor Enabling Portable Building Applications," Electrical Engineering and Computer Sciences, University of California at Berkeley, Technical Report No. UCB/EECS-2019-106, Jue 27, 2019 (118 pages).
File History for U.S. Appl. No. 12/776,159, filed May 7, 2010 (722 pages).
Final Conference Program, ACM BuildSys 2016, Stanford, CA, USA, Nov. 15-17, 2016 (7 pages).
Gao et al., "A large-scale evaluation of automated metadata inference approaches on sensors from air handling units," Advanced Engineering Informatics, 2018, 37 (pp. 14-30).
Harvey, T., "Quantum Part 3: The Tools of Autonomy, How PassiveLogic's Quantum Creator and Autonomy Studio software works," URL: https://www.automatedbuildings.com/news/jan22/articles/passive/211224010000passive.html, Jan. 2022 (7 pages).
Harvey, T., "Quantum: The Digital Twin Standard for Buildings," URL: https://www.automatedbuildings.com/news/Feb. 21/articles/passivelogic/210127124501passivelogic.html, Feb. 2021 (6 pages).
Hu, S. et al., "Building performance optimisation: A hybrid architecture for the integration of contextual information and time-series data," Automation in Construction, 2016, 70 (pp. 51-61).
International Search Report and Written Opinion for PCT Appl. Ser. No. PCT/US2017/013831 dated Mar. 31, 2017 (14 pages).
International Search Report and Written Opinion for PCT Appl. Ser. No. PCT/US2017/035524 dated Jul. 24, 2017 (14 pages).
International Search Report and Written Opinion on PCT/US2017/052060, dated Oct. 5, 2017, 11 pages.
International Search Report and Written Opinion on PCT/US2017/052633, dated Oct. 23, 2017, 9 pages.
International Search Report and Written Opinion on PCT/US2017/052829, dated Nov. 27, 2017, 24 pages.
International Search Report and Written Opinion on PCT/US2018/024068, dated Jun. 15, 2018, 22 pages.

(56) References Cited

OTHER PUBLICATIONS

International Search Report and Written Opinion on PCT/US2018/052971, dated Mar. 1, 2019, 19 pages.
International Search Report and Written Opinion on PCT/US2018/052974, dated Dec. 19, 2018, 13 pages.
International Search Report and Written Opinion on PCT/US2018/052975, dated Jan. 2, 2019, 13 pages.
International Search Report and Written Opinion on PCT/US2018/052994, dated Jan. 7, 2019, 15 pages.
International Search Report and Written Opinion on PCT/US2019/015481, dated May 17, 2019, 15 pages.
International Search Report and Written Opinion on PCT/US2020/058381, dated Jan. 27, 2021, 30 pages.
Japanese Office Action on JP Appl. No. 2018-534963 dated May 11, 2021 (16 pages with English language translation).
Koh et al., "Plaster: An Integration, Benchmark, and Development Framework for Metadata Normalization Methods," BuildSys '18, Shenzhen, China, Nov. 7-8, 2018 (10 pages).
Koh et al., "Scrabble: Transferrable Semi-Automated Semantic Metadata Normalization using Intermediate Representation," BuildSys '18, Shenzhen, China, Nov. 7-8, 2018 (10 pages).
Koh et al., "Who can Access What, and When?" BuildSys '19, New York, NY, USA, Nov. 13-14, 2019 (4 pages).
Li et al., "Event Stream Processing with Out-of-Order Data Arrival," International Conferences on Distributed Computing Systems, 2007, (8 pages).
Nissin Electric Co., Ltd., "Smart power supply system (SPSS)," Outline of the scale verification plan, Nissin Electric Technical Report, Japan, Apr. 23, 2014, vol. 59, No. 1 (23 pages).
Passivelogic, "Explorer: Digital Twin Standard for Autonomous Systems. Made interactive." URL: https://passivelogic.com/software/quantum-explorer/, retrieved from internet Jan. 4, 2023 (13 pages).
Passivelogic, "Quantum: The Digital Twin Standard for Autonomous Systems, A physics-based ontology for next-generation control and AI." URL: https://passivelogic.com/software/quantum-standard/, retrieved from internet Jan. 4, 2023 (20 pages).
Quantum Alliance, "Quantum Explorer Walkthrough," 2022, (7 pages) (screenshots from video).
Results of the Partial International Search for PCT/US2018/052971, dated Jan. 3, 2019, 3 pages.
Sinha, Sudhi and Al Huraimel, Khaled, "Reimagining Businesses with AI" John Wiley & Sons, Inc., Hoboken, NJ, USA, First ed. published 2020 (156 pages).
Sinha, Sudhi R. and PARK, Youngchoon, "Building an Effective IoT Ecosystem for Your Business," Johnson Controls International, Springer International Publishing, 2017 (286 pages).
Sinha, Sudhi, "Making Big Data Work For Your Business: A guide to effective Big Data analytics," Impackt Publishing LTD., Birmingham, UK, Oct. 2014 (170 pages).
The Virtual Nuclear Tourist, "Calvert Cliffs Nuclear Power Plant," URL: http://www.nucleartourist.com/US/calvert.htm, Jan. 11, 2006 (2 pages).
University of California At Berkeley, Eecs Department, "Enabling Scalable Smart-Building Analytics," URL: https://www2.eecs.berkeley.edu/Pubs/TechRpts/2016/EECS-2016-201.html, retrieved from internet Feb. 15, 2023 (7 pages).
Van Hoof, Bert, "Announcing Azure Digital Twins: Create digital replicas of spaces and infrastructure using cloud, AI and IoT," URL: https://azure.microsoft.com/en-US/blog/announcing-azure-digital-twins-create-digital-replicas-of-spaces-and-infrastructure-using-cloud-ai-and-iot/, Sep. 24, 2018 (11 pages).
W3C, "Sparql: Query Language for RDF," located on The Wayback Machine, URL: https://web.archive.org/web/20161230061728/http://www.w3.org/TR/rdf-sparql-query/), retrieved from internet Nov. 15, 2022 (89 pages).
Wei et al., "Development and Implementation of Software Gateways of Fire Fighting Subsystem Running on EBI," Control, Automation and Systems Engineering, IITA International Conference on, IEEE, Jul. 2009 (pp. 9-12).
Zhou, Q et al., "Knowledge-infused and Consistent Complex Event Processing over Real-time and Persistent Streams," Further Generation Computer Systems, 2017, 76 (pp. 391-406).

\* cited by examiner

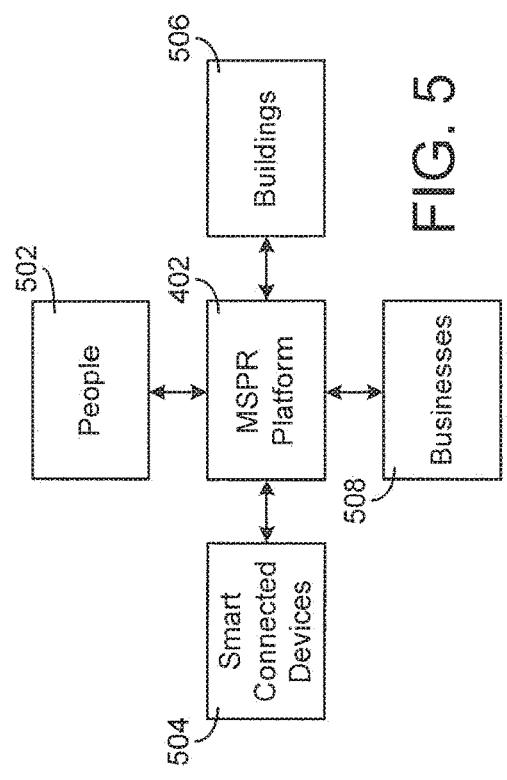
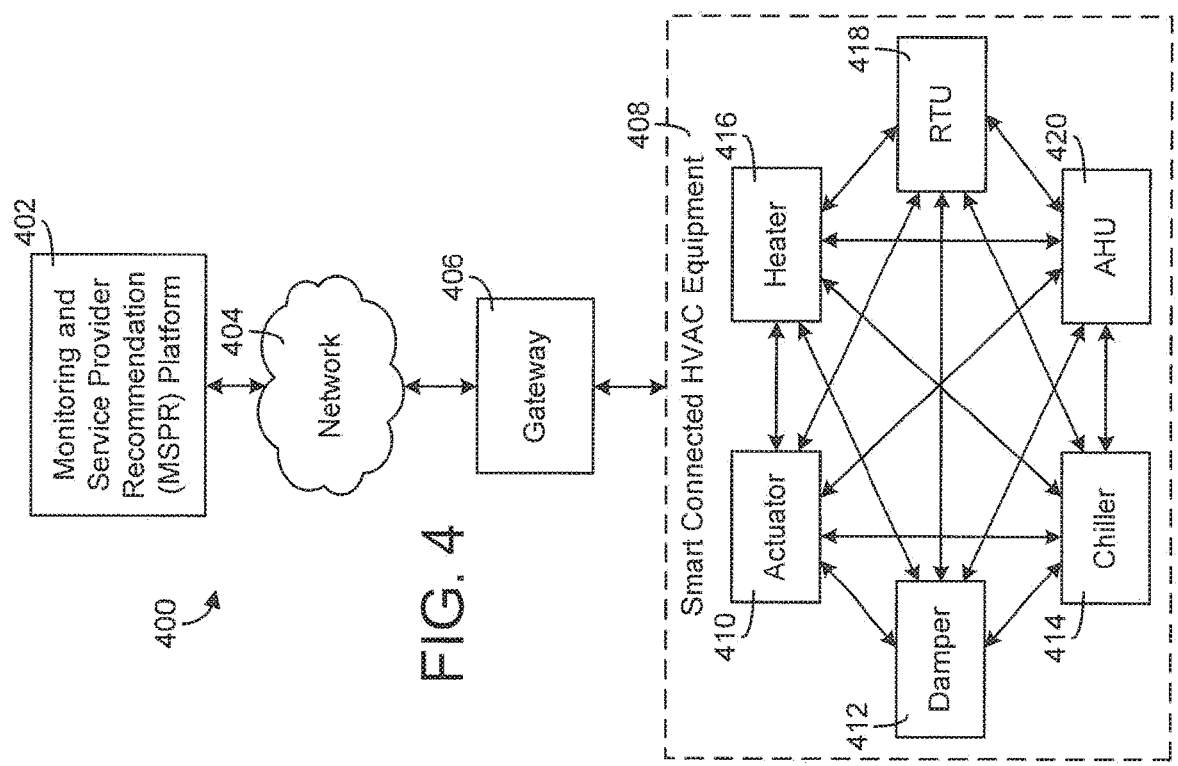
FIG. 4  FIG. 5  FIG. 6

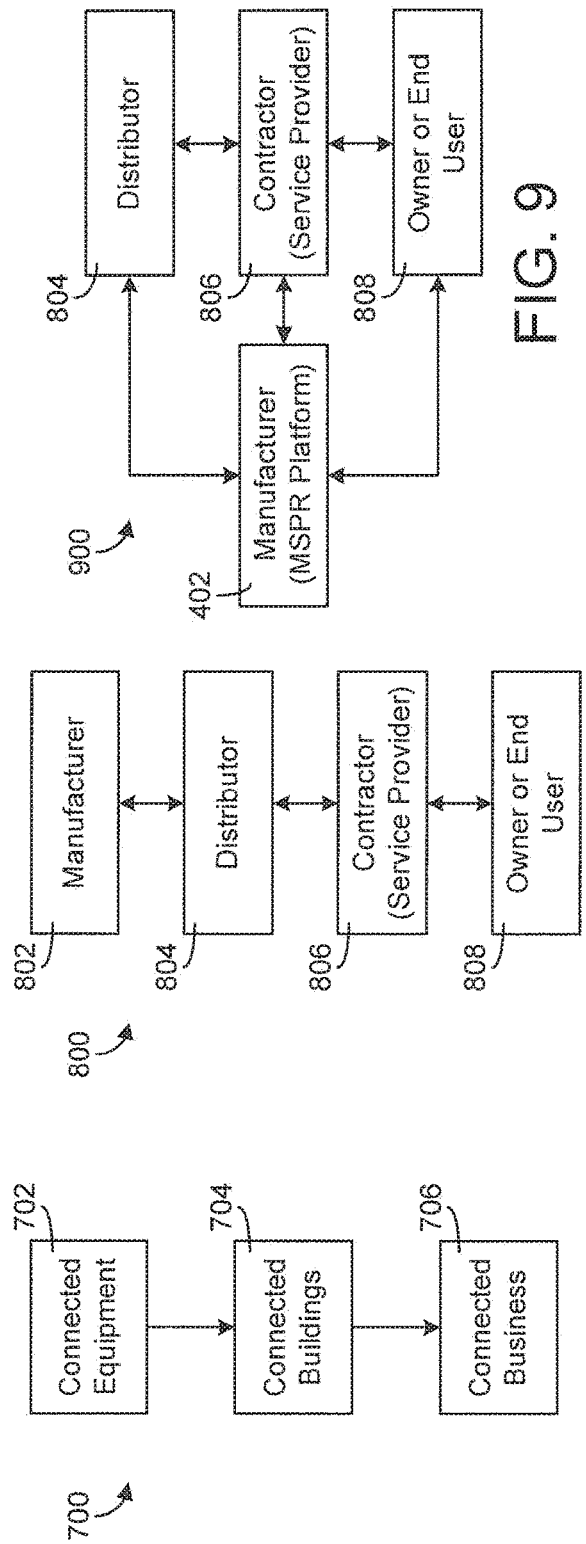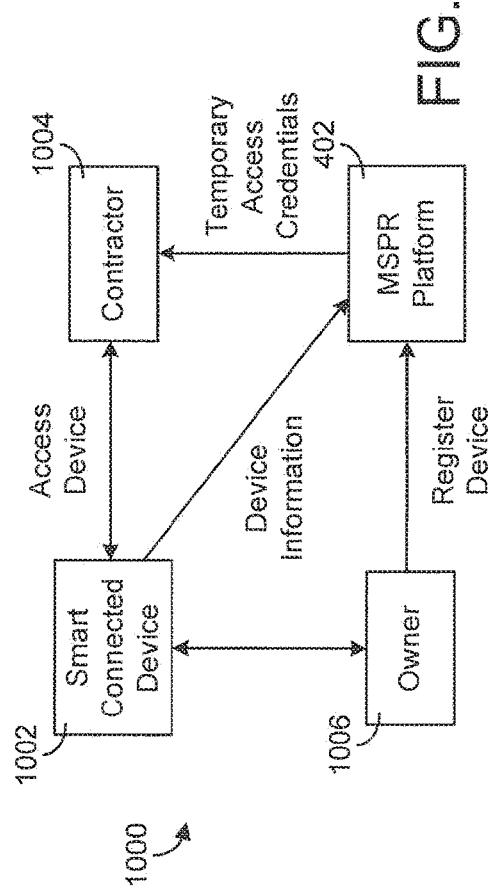

HVAC DEVICE REGISTRATION IN A DISTRIBUTED BUILDING MANAGEMENT SYSTEM

CROSS-REFERENCE TO RELATED APPLICATIONS

This application claims the benefit of and priority to U.S. Provisional Patent Application No. 62/316,468 filed Mar. 31, 2016, the entirety of which is incorporated by reference herein.

BACKGROUND

The present disclosure relates generally to the field of building management systems. A building management system (BMS) is, in general, a system of devices configured to control, monitor, and manage equipment in or around a building or building area. A BMS can include, for example, an HVAC system, a security system, a lighting system, a fire alerting system, any other system that is capable of managing building functions or devices, or any combination thereof.

In some BMS environments, the individual devices may be smart devices capable of communicating via an internet connection. This may be known as an Internet of Things (IoT) based BMS. In an IoT based BMS, devices may be added over time. However, adding device requires registration of the device into the IoT environment. The newly added device should be registered and verified to ensure that proper security precautions are taken due to the device's connection to the internet. Further, proper registration is needed to ensure that the added device can be integrated into the IoT environment, such that it can operate with the other devices within the IoT environment.

BRIEF DESCRIPTION OF THE DRAWINGS

FIG. 4 is a block diagram of a system of smart connected HVAC equipment and a monitoring and service provider recommendation (MSPR) platform that leverages data from the smart connected HVAC equipment to provide service provider recommendations, according to some embodiments.

FIG. 5 is a block diagram illustrating the MSPR platform communicating directly with people, smart connected devices, buildings, and businesses, according to some embodiments.

FIG. 6 is a block diagram illustrating a smart connected device communicating with a building infrastructure, a building owner, a MSPR platform, an equipment manufacturer, a facility manager, a contractor, and other connected devices/controllers, according to some embodiments.

FIG. 7 is a flowchart illustrating multiple stages for implementing the MSPR platform including connected equipment, connected buildings, and connected business, according to some embodiments.

FIG. 8 is a block diagram illustrating a traditional customer relationship in the HVAC industry, according to some embodiments.

FIG. 9 is a block diagram illustrating a manufacturer-centric customer relationship made possible by the MSPR platform, according to some embodiments.

FIG. 10 is a block diagram illustrating a process for providing temporary access credentials to a contractor for accessing a smart connected device to obtain data from the device and perform remote diagnostics, according to some embodiments.

SUMMARY

Figure 1:
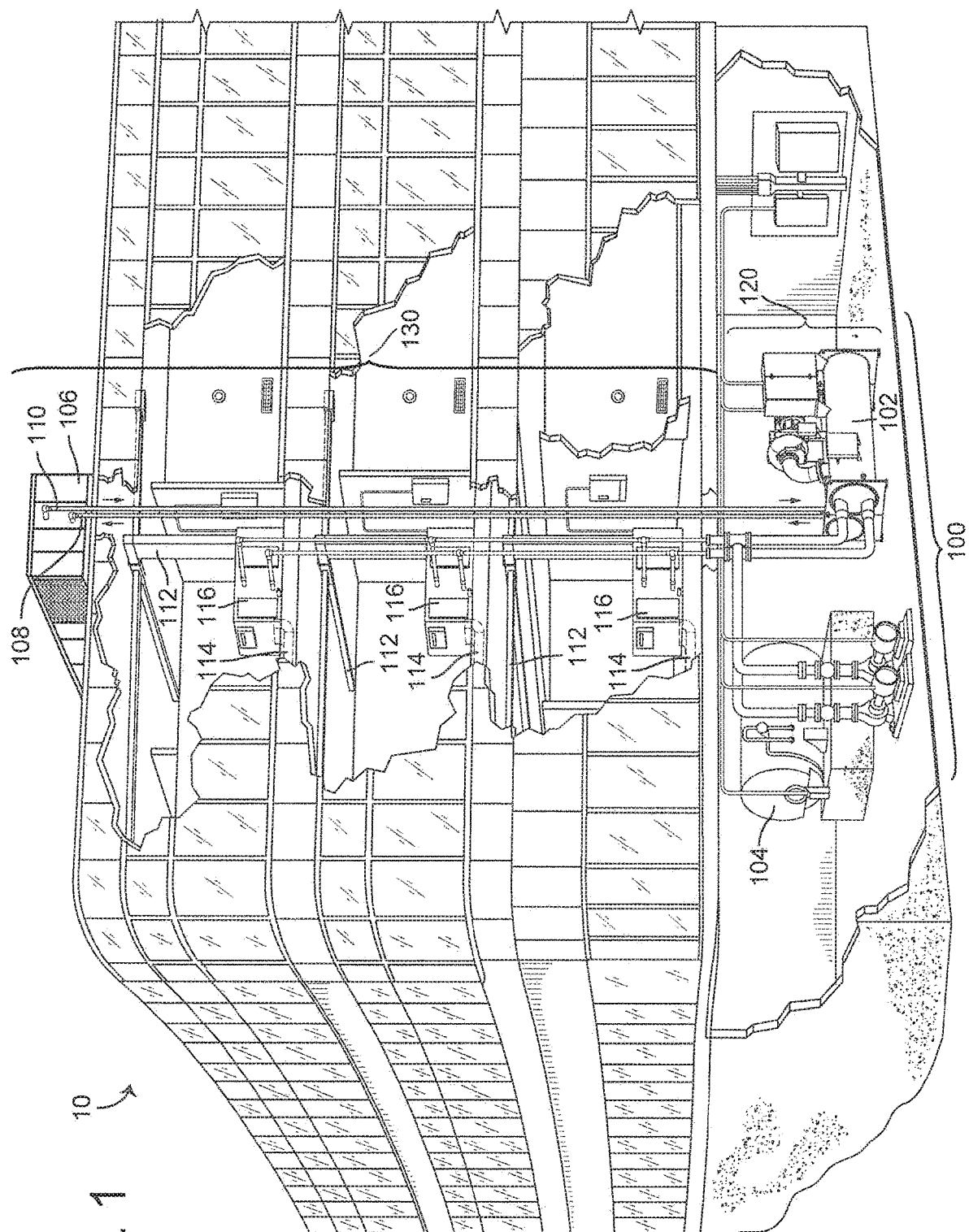
FIG. 1 is a drawing of a building equipped with an HVAC system, according to some embodiments.

One implementation of the present disclosure is a method for registering an HVAC device in a distributed building management system (BMS). The method includes requesting a token. The token is configured to authorize a registration of the HVAC device. The method further includes receiving the token at a registration service, and receiving a unique ID associated with the HVAC device at the registration service. The method also includes registering the device into a document database of the registration service and generating a device shadow associated with the HVAC device. The method also includes storing the device shadow in a memory of the distributed BMS.

Another implementation of the present disclosure is a distributed building management system. The system includes an HVAC device and a distributed BMS device. The distributed BMS device includes a processor. The processor is configured to request a token, the token is configured to authorize a registration of the HVAC device. The processor is further configured to receive the token at a registration service and receive a unique ID associated with the HVAC device. The processor is also configured to register the device into a document database of the registration service, and to generate a device shadow associated with the HVAC device within a data platform of the distributed BMS.

Another implementation of the present disclosure is method for registering an Internet of Things (IoT) HVAC device in a distributed building management system. The method includes requesting a token, the token configured to authorize a registration of the IoT HVAC device. The method further includes receiving the token at a registration service and receiving a unique ID associated with the IoT HVAC device. The method further includes registering the device into a document database of the registration service and generating a device shadow associated with the IoT HVAC device within a data platform of the distributed BMS. The method further includes claiming the IoT HVAC device. Claiming the IoT HVAC device provides secure communications between the IoT HVAC device and the distributed building management system.

DETAILED DESCRIPTION

Overview

Advancements in several technology spaces such as Big Data processing, machine learning, and network communication, and rapid convergence of many technologies have contributed to the new possibilities around "Internet of Things" (IoT). IPv6 communication protocol has exponentially magnified the number of IP addresses available for devices to be connected to the internet, and it has also enabled new capabilities around cybersecurity, network assignment and routing, transmission to multiple destinations, simplified processing by routers, amongst others. Advancements in wireless communication and protocols may allow devices to be connected inexpensively and easily. New protocols like MQTT and ZeroMQ provide lightweight data transport between devices and networks. Big data capabilities around parallel storage and processing of data allow for meaningful ways to deal with the massive data deluge caused by this unprecedented device and data connectivity. IoT may provide opportunities to create new economic benefits and business models. An IoT framework may be useful for use in building management systems (BMS) to allow for easier integration and control of smart devices to keep up with the demand for smart buildings and associated systems.

Building with HVAC Equipment

Referring now to FIG. 1, a perspective view of a building 10 is shown. Building 10 includes a HVAC system 100. HVAC system 100 may include a plurality of HVAC devices (e.g., heaters, chillers, air handling units, pumps, fans, thermal energy storage, etc.) configured to provide beating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which may be used in HVAC system 100 are described in greater detail with reference to FIGS. 2-3.

HVAC system 100 is shown to include a chiller 102, a boiler 104, and a rooftop air handling unit (ALU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Figure 2:
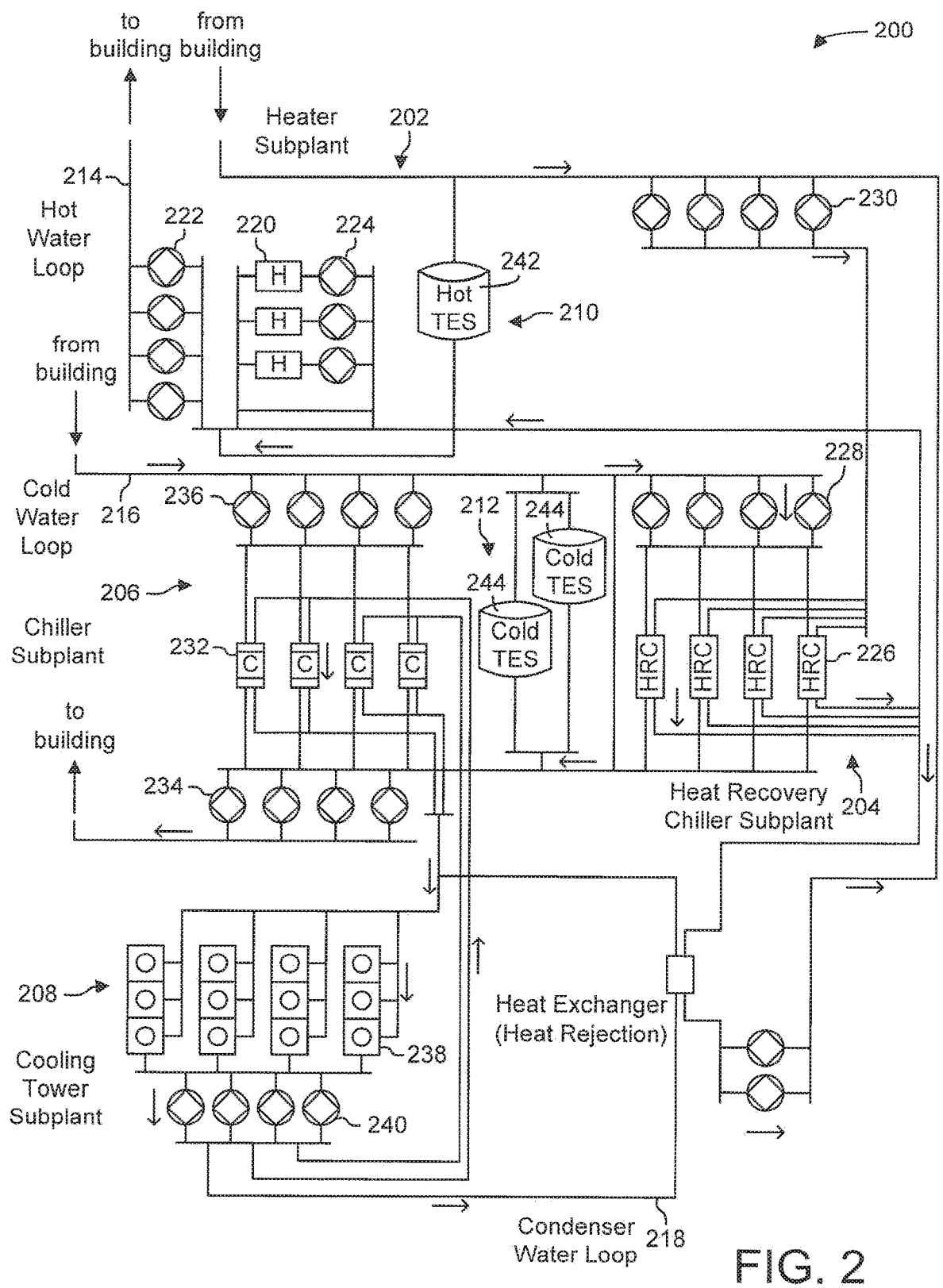
FIG. 2 is a block diagram of a waterside system which may be used as part of the HVAC system of FIG. 1, according to some embodiments.

Referring now to FIG. 2, a block diagram of a waterside system 200 is shown, according to an exemplary embodiment. In various embodiments, waterside system 200 may supplement or replace waterside system 120 in HVAC system 100 or may be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 may be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 and building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. I-lot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) may be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present invention.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves may be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Figure 3:
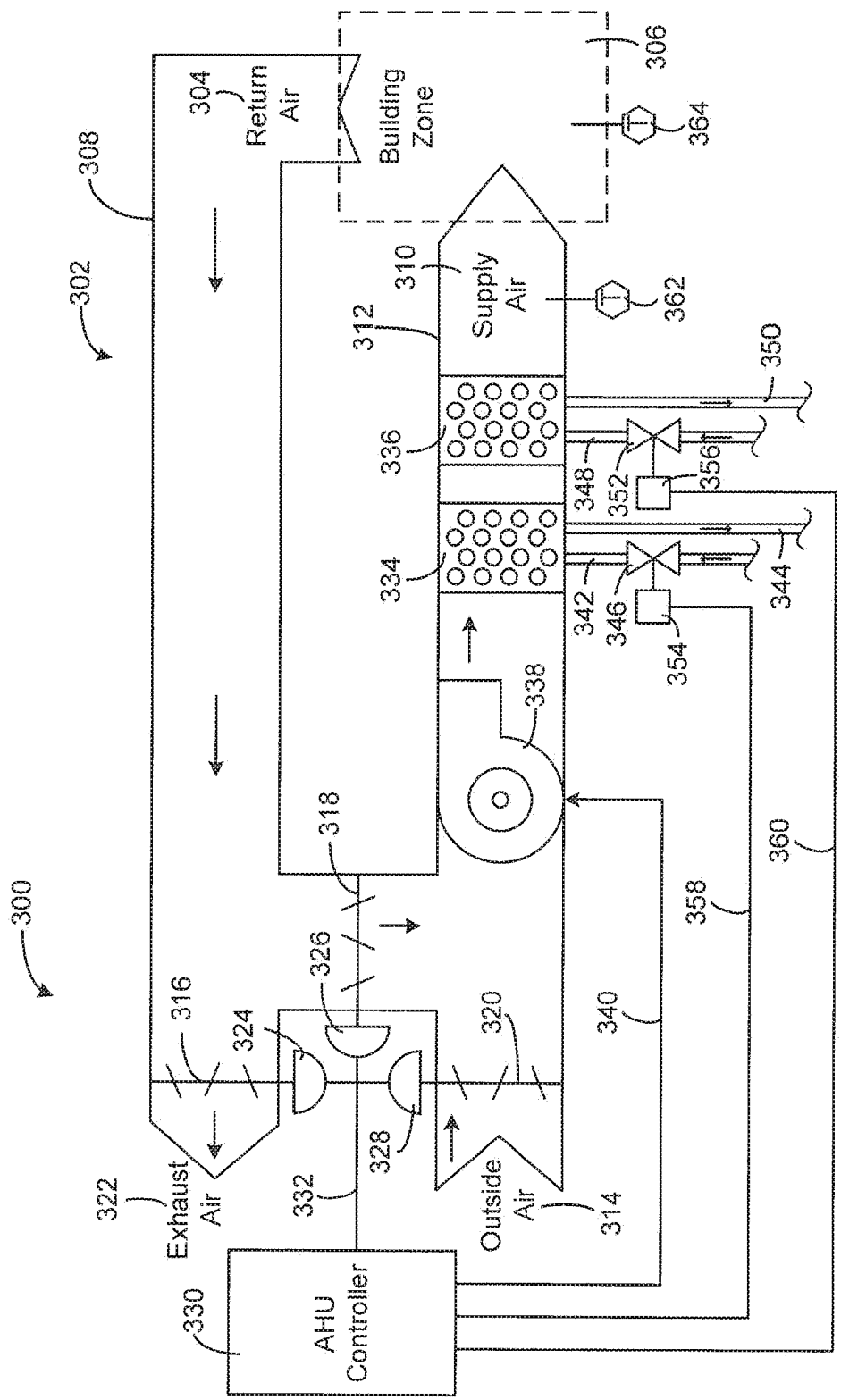
FIG. 3 is a block diagram of an airside system which may be used as part of the HVAC system of FIG. 1, according to some embodiments.

Referring now to FIG. 3, a block diagram of an airside system 300 is shown, according to an exemplary embodiment. In various embodiments, airside system 300 may supplement or replace airside system 130 in HVAC system 100 or may be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and may be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 may be configured to operate exhaust air damper 316, mixing damper 318, and outside air damper 320 to control an amount of outside air 314 and return air 304 that combine to form supply air 310. Any return air 304 that does not pass through mixing damper 318 may be exhausted from AHU 302 through exhaust damper 316 as exhaust air 322.

Each of dampers 316-320 may be operated by an actuator. For example, exhaust air damper 316 may be operated by actuator 324, mixing damper 318 may be operated by actuator 326, and outside air damper 320 may be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that may be collected, stored, or used by actuators 324-328. AHU controller 330 may be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 may be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 may be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 may be positioned along piping 348 or piping 350 to control a flow rate of the heated fluid through heating coil 336. In some embodiments, heating coil 336 includes multiple stages of heating coils that can be independently activated and deactivated (e.g., by AHU controller 330) to modulate an amount of heating applied to supply air 310.

Each of valves 346 and 352 may be controlled by an actuator. For example, valve 346 may be controlled by actuator 354 and valve 352 may be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 may control the temperature of supply air 310 and/or building zone 306 by activating or deactivating coils 334-336, adjusting a speed of fan 338, or a combination of both.

Smart Connected HVAC Equipment

Referring now to FIG. 4, a system 400 is shown including a monitoring and service provider recommendation (MSPR) platform 402, a network 404, a gateway 406, and a number of smart connected HVAC equipment 408 is shown, according to an exemplary embodiment. Smart connected HVAC equipment 408 may include an actuator 410, a damper 412, a chiller 414, a heater 416, a rooftop unit (RTU) 418, an air handling unit (AHU) 420, and/or any other type of equipment or device that can be installed within building 10 (e.g., fans, pumps, valves, etc.). Although the present invention is described primarily with reference to HVAC equipment, it should be understood that the systems and methods described herein may be applicable to a wide variety of building equipment and other types of connected devices (e.g., HVAC equipment, LED lights, mobile phones, elevators, fire safety systems, smart street lamps, cars, televisions, etc.) with embedded intelligence and communication capabilities.

Smart connected HVAC equipment 408 may be configured to communicate with each other and with remote services (e.g., remote monitoring and analytics services, cloud-based control services, etc.). In some embodiments, smart connected HVAC equipment 408 have ubiquitous connectivity (i.e., are always connected) and have their own processing and analytics capabilities. Smart connected HVAC equipment 408 may be managed in the cloud through various software applications and the analytics models built to control them. As such, a field/supervisory controller or building automation system may not be required. For example, a smart actuator that has built in position feedback, computing power, and a communication network can provide a cost-effective solution that can perform local decision making. A series of smart actuators and dampers that work together can provide completely autonomous manipulation of a building and/or BMS.

Smart connected HVAC equipment 408 may communicate with each other using any of a variety of communications protocols. In some embodiments, smart connected HVAC equipment 408 communicate with each other wirelessly using a wireless communications protocol (e.g. Wi-Fi, Bluetooth, 3G/4G, 802.15.4, ZigBee, etc.). The particular communications protocol used by smart connected HVAC equipment 408 may be dependent upon the power requirements, bandwidth requirements, and/or the existing infrastructure within the building in which smart connected HVAC equipment 408 are installed. In some embodiments, smart connected HVAC equipment 408 communicate with each other using a proprietary building equipment protocol (e.g., BACNet, ZigBee, Modbus, etc.) to move data between various devices of smart connected HVAC equipment 408. In order to build applications on top of those protocols, these protocols may be converted into the Internet Protocol (IP). In some embodiments, a communications gateway 406 is used for such a conversion.

In some embodiments, only a few of the smart connected HVAC equipment 408 communicate with the outside network 404 (e.g., a cellular network, a WAN, the Internet, etc.). However, in other embodiments most (e.g. more than 75%) of the smart connected HVAC equipment 408 may communicate with the outside network 404. Data may be exchanged between smart connected HVAC equipment 408 and then transmitted to the outside network 404 by a subset of smart connected HVAC equipment 408. The types of data transmitted by smart connected HVAC equipment 408 may include, for example, measurements recorded by sensors integrated with smart connected HVAC equipment 408, device status information, diagnostic information, configuration information, device identity information, a software version, a hardware version, or any other information related to smart connected HVAC equipment 408 or the operation thereof. In order for the data to be consumed by the various software applications, a contextual protocol (e.g., RESTful API, CoAP HTTP, AMQP, MQTT) may be used to provide contextual information on the data. An API may be used to share data with the external world using a clean abstraction.

Still referring to FIG. 4, system 400 is shown to include a communications gateway 406 and a network 404. Gateway 406 may be used to connect legacy and new equipment (e.g., temperature sensors, actuators, cooling or heating devices, industrial robots, personal health monitoring devices, etc.), to get the data from them, and in return to control them based on the instructions or analytical results from the remote services. Gateway 406 may provide network security, access control, and unique address of legacy devices' endpoints for remote access and protocol mediation services. In some embodiments, gateway 406 is a general-purpose gateway solution made by any of a variety of hardware manufacturers (e.g., Intel, FreeScale, Dell, Texas Instruments, etc.). In other embodiments, gateway 406 is a network control engine (NCE) mobile access portal (MAP) gateway used specifically to connect building automation systems and smart equipment. Gateway 406 may use various Internet-based protocols (e.g., CoAP, XMPP, AMQP, MQTT, etc.) and web-based common data exchange (e.g., HTTP RESTful APIs) to translate communications from a building automation system protocol to an Internet protocol.

Network 404 may include the Internet and/or other types of data networks, such as a local area network (LAN), a wide area network (WAN), a cellular network, a satellite network, a radio network, or any other type of data network or combination thereof. Network 404 may include any number of computing devices (e.g., computers, servers, routers, network switches, etc.) configured to transmit, receive, or relay data. Network 404 may further include any number of hardwired and/or wireless connections. For example, smart connected HVAC equipment 408 may communicate wirelessly (e.g., using a Wi-Fi__33 or cellular radio, etc.) with a transceiver that is hardwired (e.g., via a fiber optic cable, a CAT5 cable, etc.) to a computing device of network 404.

Network 404 may include services that facilitate managing the fixed or wireless communication with smart connected HVAC equipment 408. Network vendors may include, for example, cellular telecommunications providers (e.g., Verizon, T-Mobile, AT&T, etc.) as well as internet service providers. Communications via network 404 may leverage enterprise contracts and partnerships to optimize the cost of data transmission. Many network carriers provide a secure connection option as a part of premium services. However, a similar degree of network securities can be achieved via employing trust platform chip in smart connected HVAC equipment 408 and using encrypted messaging such as AMQP via an Internet-based secure transport.

Still referring to FIG. 4, system 400 is shown to include a monitoring and service provider recommendation (MSPR) platform 402. MSPR platform 402 may operate as a remote system that receives and processes data provided by smart connected HVAC equipment 408 from many different buildings. MSPR platform 402 may leverage the data provided by smart connected HVAC equipment 408 to provide a variety of services. Services provided by MSPR platform 402 may include, for example, device management, data routing and real-time analytics, data management services, and batch analytics. Additionally, MSPR platform 402 may include monitoring and reporting applications, connected chiller applications, fault detection and diagnostics (FDD) applications, data analytics, and automated service provider recommendations. For example, a connected chiller (i.e., a type of smart connected HVAC equipment 408) may communicate with MSPR platform 402. The connected chiller application may integrate industry-leading remote monitoring and analysis tools with planned service agreements and warranties. This allows MSPR platform 402 to provide enhanced responsiveness and expertise to one of the most critical pieces of equipment in the facility.

Referring now to FIG. 5, MSPR platform 402 is shown as a central system that connects smart connected devices 504 (e.g., HVAC equipment and/or any other devices, smart connected HVAC equipment 408), buildings 506, people 502, and businesses 508. For example, smart connected devices 504 may provide their current status, analytics results, fault detections, measurements, identity information, equipment models that represent smart connected devices 504, and/or other information associated with smart connected devices 504 to MSPR platform 402. MSPR platform 402 may perform analytics on the data provided by smart connected devices 504. Analytics may be used to facilitate the various services provided by MSPR platform 402. For example, MSPR platform 402 may build statistical models that use data from smart connected devices 504 to infer patterns, perform comparisons, perform trend analyses and predictions, or even teach smart connected devices 504 to correct themselves (e.g., by providing adjusted operating parameters to smart connected devices 504).

MSPR platform 402 may use the data from smart connected devices 504 to determine how smart connected devices 504 are being used, to broaden the value proposition beyond the physical equipment, to include valuable data and value-added services, and to form closer relationships with customers. MSPR platform 402 may create usage reports for sales, marketing and product development to improve quality and create better pricing and product positioning. MSPR platform 402 may provide the usage reports to various people 502 (e.g., a building owner, a facility manager, etc.) to provide insight into how smart connected devices 504 are being used. In some embodiments, MSPR platform 402 augments data from smart connected devices 504 with external data (e.g., weather data, utility data, meter data, building occupancy, etc.) to provide extra information for better decision making.

The benefits provided by MSPR platform 402 include increased uptime for smart connected HVAC equipment 408, reduced future repair costs, extended asset life, using service experts with operational and trend data to assist in troubleshooting, and higher service renewal. MSPR platform 402 may be configured to implement a condition-based maintenance program to shorten the time to repair via remote diagnostics and optimized logistics in parts ordering and tool rentals. Potential outcomes of the services provided by MSPR platform 402 include a decreased number of unplanned repairs, optimized routine maintenance intervals, and reduced routine maintenance.

Referring now to FIG. 6, a smart connected device 602 may be connected to a building infrastructure 606, an owner 608, MSPR platform 402, a manufacturer 610, a facility manager 612, a contractor 614, and/or other smart connected devices and controllers 604. Smart connected device 602 may transmit its current status, analytics results, fault detections, measurements, its identity, an equipment model that represents smart connected device 602, and/or other information to the various entities with which smart connected device 602 is connected. For example, a smart connected rooftop may interact with an owner 608, an occupant, an OEM, and a contractor directly. A rooftop failure or failure symptom may be sent to MSPR platform 402 to orchestrate replacement or initiate a maintenance project. MSPR platform 402 may send alerts and a list of local service providers to the building owner 608. Thereby, certified contractors 614 who subscribe to MSPR platform 402 may have a higher chance to win the service contract. The service provider recommendation features of MSPR platform 402 are described in greater detail below.

Automated Monitoring and Diagnostics to Improve Products and Services

MSPR platform 402 may use the data provided by smart connected HVAC equipment 408 to develop improved products and/or services. Developing improved products and services may include improving existing products and services as well as developing new products and services. For example, MSPR platform 402 may determine how to improve the operation of smart connected HVAC equipment 408 (e.g., optimizing energy consumption in a building, maintaining uptime of the equipment, etc.). MSPR platform 402 may use the remote diagnostics and repair to reduce downtime and unscheduled maintenance. In some embodiments, MSPR platform 402 creates a continuous feedback loop of how the customer uses smart connected HVAC equipment 408 to inform design, engineering and manufacturing decisions, to make the equipment better. MSPR platform 402 may also send automatic software updates to smart connected HVAC equipment 408 to add features and improve the performance of the equipment without any physical intervention.

In some embodiments, MSPR platform 402 uses the data provided by smart connected HVAC equipment 408 to help customers operate the equipment better and to enable service technicians to service the equipment better. The connectivity provided by smart connected HVAC equipment 408 allows MSPR platform 402 to monitor the equipment for critical alarms and notify service technicians if any issues arise. As the amount of collected data increases, the analytics model used by MSPR platform 402 continues to learn and improve over time. The analytics model may use the information from smart connected HVAC equipment 408 to identify opportunities for creating new physical products or even new information products. For example, MSPR platform 402 may identify opportunities to combine the functionality of two or more existing products (e.g., a video camera within a LED light bulb) to develop a new and improved product. The new and improved products may include, for example, a sensor or controller that can perform diagnostics and self-troubleshooting and/or other types of functionality that may eliminate the need for other products.

Advantageously, the connectivity provided by smart connected HVAC equipment 408 may facilitate a ubiquitous connection of various types of equipment within a building. Machine learning provided by MSPR platform 402 may use information provided by smart connected HVAC equipment 408 to develop a comprehensive view of controls in the building environment. In some embodiments, MSPR platform 402 provides building operators with a visually clean and intuitive view of the building operations and the ability to resolve issues in real-time. As more information is gathered regarding the patterns of how the building works, and under what circumstances and parameters, this information can be used by people outside of the manufacturing and building industry to improve products and services that affect the building.

MSPR platform 402 may allow vendors of HVAC equipment 408 and related services to sell more of their products and services. For example, MSPR platform 402 may generate usage information that can be used to develop a better understanding of the lifecycle and usage of the HVAC equipment 408. This information may also enable service providers to sell more services proactively. For example, MSPR platform 402 may use the lifecycle information for a particular type of HVAC equipment 408 to determine when that HVAC equipment 408 is expected to require maintenance or replacement. MSPR platform 402 may then recommend preventative maintenance and/or replacement before a failure occurs. Such information may also allow an equipment vendor to optimize sales channels to sell more equipment and parts.

MSPR platform 402 may reduce service operational costs and increase efficiency. For example, advanced diagnostics and remote monitoring capabilities provided by MSPR platform 402 may reduce the time required for a service technician to troubleshoot an issue. This may reduce the time spent performing service calls and may improve productivity.

MSPR platform 402 may enhance the value of installed equipment. For example, MSPR platform 402 can analyze the usage information from smart connected HVAC equipment 408 to provide insights to customers and optimize the performance of the HVAC equipment 408. A building owner or operator can interact with MSPR platform 402 (e.g., via a monitoring and control interface) to obtain current status information, control parameters, diagnostic information, and other types of information related to the installed equipment (e.g., equipment manuals, warranty information, etc.). The control functionality provided by MSPR platform 402 may make controls seamless and transparent to building owners and operators.

MSPR platform 402 may create more value for customers with minimal physical contact with smart connected HVAC equipment 408. For example, MSPR platform 402 may automatically send updates to smart connected HVAC equipment 408 to enhance features and fix bugs. Analytics provided by MSPR platform 402 may provide customers with information (e.g., via an interface of a mobile device) to act upon on potential failures in their equipment or building.

MSPR platform 402 may allow an equipment/service vendor to increase its customer base with better differentiated products and services. For example, MSPR platform 402 can recommend specific types of equipment and/or services that would provide value to a customer based on the usage information gathered from the customer's equipment. Additionally, MSPR platform 402 as a whole can be provided as a service to new and existing customers.

MSPR platform 402 may create new business models and opportunities. For example, MSPR platform 402 may allow a contractor to increase the number of service contracts and margins. The usage information from smart connected HVAC equipment 408 can also be provided to an insurance provider. The insurance provider may use the usage information to determine an appropriate risk level for a building, which allows the insurance provider to set more accurate insurance premiums. The proactive repair and replacement suggestions provided by MSPR platform 402 may decrease the number of failures (e.g., by repairing or replacing equipment before failures occur), which reduces insurance claims and improves the margins of an insurance contract.

Referring now to FIG. 7, a process 700 for implementing MSPR platform 402 is shown, according to an exemplary embodiment. Process 700 is shown to include three stages: connected equipment 702, connected buildings 704, and connected business 706. Each of these stages can be implemented by making changes to sensors, data collection, and a business model. Changes to sensors may include changes made to physical devices and equipment. Each device or manufactured part becomes a sensor of the environment that they are actuating. Changes to data collection may include changes in the systematic collection, management, and analysis of the data that collected from the sensors (i.e., smart connected HVAC equipment 408). Changes to the business model may include changes that can be made to monetize the features provided by MSPR platform 402.

In connected equipment stage 702, ubiquitous connectivity of smart connected HVAC equipment 408 in a building may be provided. MSPR platform 402 may use data analytics to analyze information provided by smart connected HVAC equipment 408. Such data analytics may include, for example, modeling, graphing, and scaling out the information provided by smart connected HVAC equipment 408. Data analytics may further include real-time data analytics and machine learning.

Changes to the business model may include improving existing businesses (e.g., making them more efficient) and improving existing products. MSPR platform 402 may offer data analytics products as a service (e.g., with monthly billing) to allow building operators to get a clean and holistic view of the data associated with their buildings from mobile devices. Service technicians may also access the clean and holistic view of the data associated with a building to easily diagnose and repair problems more efficiently. Existing products can be offered as a service rather than product ownership. For example, a building owner or operator may subscribe to MSPR platform 402 (e.g., paying a monthly subscription fee), which provides access to the information provided by MSPR platform 402 including alerts when service and/or repair is recommended. Usage data from smart connected HVAC equipment 408 may be used to improve manufacturing reactively by detecting and fixing problems with equipment parts.

In connected buildings stage 704, information from smart connected HVAC equipment 408 can be aggregated across buildings to improve the capabilities and efficiency of smart connected HVAC equipment 408 (e.g., improving the autonomous control decisions made by the HVAC equipment 408). MSPR platform 402 may develop richer and more flexible models to integrate data from different buildings (e.g., richer schema). MSPR platform 402 may also develop richer analytical models (e.g., graph and probabilistic models) to deal with data heterogeneity and the added complexity of modeling across buildings (e.g., using other data to add context such as local/national laws and environmental/weather related operational considerations).

Changes to the business model may include expanding the services from connected equipment stage 702. Predictive analytics may be used to forecast a future electricity bill for the building based on historical data for other buildings in the region). A manufacturer, distributor, or service provider can use the information provided by MSPR platform 402 to guarantee equipment uptime (e.g., 95% uptime) or indoor temperature. MSPR platform 402 may monetize such information by charging monthly/annual service fees or by taking percentage of the cost savings.

Changes to the business model may further include changing the customer relationships and the value chain. For example, customer relationships may change from one-off purchases and services to more of a continuous consultative sales relationship, thereby increasing the lifetime value of a customer. MSPR platform 402 may establish direct relationships with customers (e.g., building owners) by providing customers with access to the monitoring information and service provider recommendations generated by MSPR platform 402.

In connected business stage 706, smart connected HVAC equipment 408 may be augmented with its own computing power and control capabilities. New features may be added to the data analytics, monitoring, reporting, and service provider recommendations generated by MSPR platform 402.

Changes to the business model may use data as a form of currency. For example, the data gathered from smart connected HVAC equipment 408 can be monetized in HVAC-related products, services, and markets (e.g., by selling more equipment, repair services, etc.), as well as in other industries. MSPR platform 402 may aggregate relevant data and models for the components, equipment and people across multiple different buildings. The data can be segmented by different regions, building types, age, size, and other factors. In some embodiments, MSPR platform 402 provides the data to insurance companies, which may use the data to refine their actuarial model and create pricing that's based on true usage and occupants behaviors. MSPR platform 402 may also provide insurance companies with data from water leakage detection sensors integrated with some types of smart connected HVAC equipment 408 (e.g., connected rooftop units) to provide an early warning of potential water damage.

In some embodiments, MSPR platform 402 provides the data to utilities, which may use the data to understand the energy usage profiles of the buildings and help them better manage the grid and the infrastructure that they need to build. In some embodiments, MSPR platform 402 provides the data to governmental agencies (e.g., city, state, national, etc.), which may use the data for better planning and allocation of resources. In some embodiments, MSPR platform 402 provides the data to energy storage companies, which may use the data to estimate the amount of energy generated by the buildings. MSPR platform 402 may help building owners to optimize equipment performance and connect them with the contractors to fix problems.

Manufacturer-Centric Customer Relationships

Referring now to FIG. 8, a block diagram 800 illustrating a traditional customer relationship in the HVAC industry is shown. In the traditional customer relationship, an equipment manufacturer 802 provides HVAC equipment to a distributor 804. Distributor 804 receives purchase orders from a contractor 806 (e.g., a reseller or service provider) and provides the HVAC equipment to contractor 806. Contractor 806 then installs the HVAC equipment in the building of an owner or end user 808. Manufacturer 802 interacts only with distributor 804 and has no contact with building owner or end user 808 of the HVAC equipment. Once the HVAC equipment is installed, owner or end user 808 interacts only with contractor 806 if the HVAC equipment requires service or replacement.

Referring now to FIG. 9, a block diagram 900 illustrating a manufacturer-centric customer relationship made possible by MSPR platform 402 is shown. In the manufacturer-centric customer relationship, manufacturer 802 uses MSPR platform 402 to interact directly with distributor 804, contractor 806, and building owner or end user 808. Smart connected HVAC equipment 408 within the building of owner or end user 808 communicates with MSPR platform 402, which may be owned or operated by manufacturer 802. For example, smart connected HVAC equipment 408 may transmit its current status, analytics results, fault detections, measurements, its identity, an equipment model that represents smart connected HVAC equipment 408, a software version, a hardware version, and/or other information to MSPR platform 402. MSPR platform 402 may use the data from smart connected HVAC equipment 408 to automatically detect and diagnose faults and to determine appropriate replacement or repair actions for smart connected HVAC equipment 408. MSPR platform 402 may send alerts and a list of local contractors 806 (e.g., service providers) to the building owner 808. The building owner 808 may then select one of contractors 806 to service the HVAC equipment.

The manufacturer-centric customer relationship represents a fundamental shift in managing customer relationships in the HVAC industry. This relationship change may result in weaker dependency on distributors 804 and contractors 806. Manufacturer 802 now has the opportunity to capture more profits from the overall value chain. Furthermore, manufacturer 802 can use the data received from smart connected HVAC equipment 408 to learn how its products and features are being accessed and utilized.

A detected fault represents repair or replacement opportunity for smart connected HVAC equipment 408, which becomes revenue for contractor 806 and a part sale opportunity for distributor 804. MSPR platform 402 may present these opportunities to both contractor 806 and distributor 804 to capture business in almost real-time. Given an informed fault (e.g., a fault accompanied by diagnostic information), contractor 806 may prepare a service cost estimate based on service part availability and diagnostic results. Contractor 806 may submit a bid to MSPR platform 402, which provides the bid, along with bids from other contractors, to building owner 808. Building owner 808 can select a contractor 806 based on the bid information and service proposals. Once a contractor 806 is selected, MSPR platform 402 may inform the selected contractor 806 that it has won the service contract.

Access to Smart Connected HVAC Devices

Referring now to FIG. 10, a block diagram 1000 illustrating the types of information provided between a smart connected device 1002, a building owner 1006, MSPR platform 402, and a contractor 1004 is shown, according to an exemplary embodiment. When smart connected device 1002 is installed, building owner 1006 may register smart connected device 1002 with MSPR platform 402. In some embodiments, smart connected device 1002 is provisioned in such a way that only building owner 1006 (and possibly MSPR platform 402) has access to smart connected device 1002. Smart connected device 1002 sends device information (e.g., status, identity, diagnostic results, measurements, etc.) to MSPR platform 402.

When a repair or replacement opportunity is identified by MSPR platform 402, MSPR platform 402 may provide temporary access credentials to contractor 1004. Contractor 1004 may use the temporary access credentials to access smart connected device 1002 and obtain detailed status and diagnostic information from smart connected device 1002. The temporary access credentials may expire after a defined time period or upon completion of a defined action (e.g., completing service on the smart connected device 1002) which prevents contractor 1004 from accessing smart connected device 1002 once the service contract is complete.

Internet of Things Framework

Figure 11:
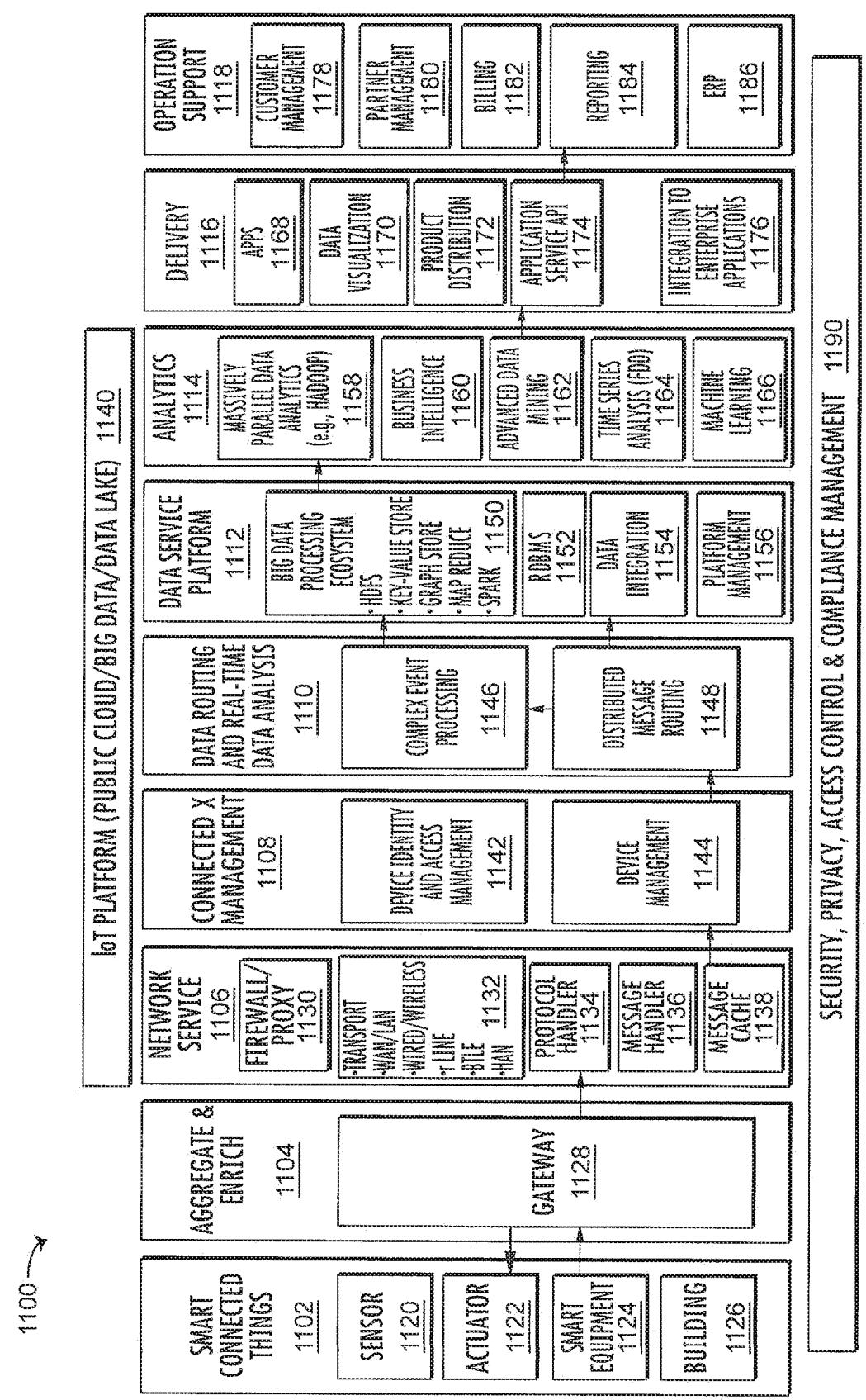
FIG. 11 is a block diagram illustrating the components of an ecosystem in which the MSPR platform may be implemented, according to some embodiments.

Referring now to FIG. 11, a block diagram illustrating the components of an ecosystem 1100 in which MSPR platform 402 may be implemented is shown, according to an exemplary embodiment. Ecosystem 1100 is shown to include an Internet of Things (IoT) platform 1140, which may be the same or similar to MSPR platform 402 previously described. Ecosystem 1100 may allow IoT platform 1140 to facilitate self-conscious buildings that include smart connected equipment and/or devices (e.g., smart connected HVAC equipment 408, etc.). Many different types of partnerships may be used to facilitate self-conscious buildings. Examples of such partnerships include regional partnerships, global partnerships, channel partnerships, industry organization, and technology partners. In FIG. 11, each vertical column 1102-1118 represents technology components that could be installed in the self-conscious building, provided by IoT platform 1140, or purchased from or co-developed with a vendor or partner.

IoT platform 1140 of ecosystem 1100 may include a network of physical objects or "things" embedded with electronics, software, sensors, and/or network connectivity that enable such objects to collect and exchange data. The IoT platform 1140 may facilitate linking the physical and digital world by allowing remote sensing and control of devices across new and/or previously existing communication infrastructure. The IoT platform 1140 represents components and technologies that may enable delivering an end-to-end solution for IoT enabled products and services. The IoT platform 1140 also can include various processes and applications, which may further be utilized in creating and maintaining an IoT ecosystem 1100.

The IoT platform 1140 is shown to include vertical columns (e.g. technology concepts) such as smart connected devices 1102, data aggregation and enrichment 1104, network services 1106, device management 1108, data routing and real-time data analytics 1110, data service platform 1112, analytics 1114, delivery 1116 and business/operation support 1118. Each of these technology components will be described in more detail below.

The smart connected devices 1102 can include one or more devices within a IBMS, and particularly "smart devices" such as the smart HVAC equipment 408, described above. As shown in FIG. 11, the smart devices can include sensors 1120, actuators 1122, smart equipment 1124, smart buildings 1126, and the like. According to one embodiment, a smart connected device 1102 includes any device which has communication capabilities, computing power, and that is capable of making decisions at a local level (e.g., in a limited context, etc.). Communication with the smart connected devices 1102 may be through any wireless or wired communication protocol. The computing power may be enabled by a microprocessor with an embedded operating system (e.g., Linux, Android, iOS, RTOS, Windows 10, etc.). The computing power may be used locally to store data from the device (e.g., temporarily, etc.) and/or execute pre-determined operations (e.g., decision trees, etc.). The pre-determined operations may include isolated fault detection, device diagnostics, and/or other operations. The smart devices may additionally have fault response capabilities to allow the smart devices to be adaptive and responsive to changing environmental and/or operational conditions (e.g., weather, loading, etc.). In some embodiments, the ecosystem 1100 includes devices that are not smart connected devices 1102, but may be connected to the IoT platform 1140 via device or field gateways used as a proxy to facilitate communication between the non-smart devices and the IoT platform 1140 over public and/or private networks (e.g., using fully secure defensible server platforms with high capability hardware, etc.). Such connection is described more fully herein.

Smart connected devices 1102 may further include actuators, dampers, chillers, heaters, rooftop units (RTU), air handling units (AHU), and/or any other type of equipment or device that can be installed within a building (e.g., fans, pumps, valves, etc.). Although the present invention is described primarily with reference to HVAC equipment, it should be understood that the systems and methods described herein may be applicable to a wide variety of building equipment and other types of connected devices (e.g., HVAC equipment, LED lights, mobile phones, tablets, computers, elevators, fire safety systems, smart street lamps, cars, televisions, security systems, refrigerators, music systems, printers, washing machines, dish washers, coffee makers, etc.) with embedded intelligence and communication capabilities.

Ecosystem 1100 is shown to include data aggregation and enrichment 1104 technical component. The smart gateway technical component may include smart gateway 1128. The gateway 1128 may be used to connect legacy and new equipment (e.g., temperature sensors, actuators, cooling or heating devices, industrial robots, personal health monitoring devices, etc.) to get the data from them, and in return to control them based on the instructions or analytical results from the remote services. The gateway 1128 may provide network security, access control, and unique addresses of legacy devices' endpoints for remote access and protocol mediation services. In some embodiments, the gateway 1128 is a general-purpose gateway solution made by any of a variety of hardware manufacturers (e.g., Intel, FreeScale, Dell, Texas Instruments, etc.). In other embodiments, gateway 1128 is a NCE or MAP gateway used specifically to connect building automation systems and smart equipment. The gateway 1128 may use various Internet-based protocols (e.g., CoAP, XMPP, AMQP, MQTT, etc.) and web based common data exchange (e.g., HTTP RESTful APIs) to translate communications from a building automation system protocol to an Internet protocol. For example, the gateway 1128 may provide protocol conversions that make legacy non-IP enabled devices able to be accessed through modern web/IP protocols (e.g., converting BACnet Serial to CoAP, MQTT, or AMQP).

The gateway 1128 may include a soft component and/or a physical device with embedded components that performs various functions. For example, the gateway 1128 may optimize the cost of communication between a connected device (e.g., smart device, smart connected devices 1102, non-smart connected things, etc.) and the rest of the digital world. In another example, the gateway 1128 may identify resources contained in the connected devices. In yet another example, the gateway 1128 may perform semantic mediation of data being received from the connected devices (e.g., naming translation of data obtained from devices for global consumption in a standardized manner, etc.).

In one embodiment, the gateway 1128 allows one or more smart connected devices 1102 to make outbound connections to a public or private cloud-based server, which is used for further storage and processing by components of ecosystem 1100. Inbound connections may not be typically allowed for cybersecurity considerations; however, in some instances, secured and controlled inbound messaging is used to drive actions at the device level that may be facilitated by the IoT platform 1140. In one example, the gateway 1128 may leverage an organization's internal technology infrastructure and/or a public telemetry infrastructure to provide a secure and controlled inbound messaging scheme. In a further embodiment, the gateway 1128 is configured to provide protocol conversion services, network address translation services, containers for messages, applications to understand different protocols such as Bluetooth, ZigBee, Z-wave, BACNet, etc., and/or any other user installed application.

In one embodiment, the gateway 1128 includes a number of field gateway aspects that primarily interface with devices and cloud-based servers. The field gateway aspects can enable the gateway 1128 to perform high scale telemetry ingestion, device identification, device management, and cloud-to-device commanding (e.g., when allowed). For example, in a home, several smart devices like a security system, a television, a refrigerator, a music system, a printer, a computer, a washing machine, a coffee maker, a garage door, etc. may have elements of field gateways built into them and you could use a singular home automation device to act as the cloud gateway. In another example, in a manufacturing or process plant, individual production line machines may have field gateways built into them and connect via some common cloud gateway organized by production lines, processes, and/or zones. In still another example, in an office building having an HVAC system (e.g., smart connected HVAC equipment 408, etc.), there may be dozens of devices and hundreds of sensors with smart field gateway capabilities connected through a common cloud gateway.

The network service 1106 may include the Internet and/or other types of data networks, such as a local area network (LAN), a wide area network (WAN), an Internet area network (IAN), a home area network (HAN), a body area network (BAN), a cellular network, a satellite network, a radio network, or any other type of data network or combination thereof. Network service 1106 is shown to include a firewall/proxy 1130, one or more transport protocols 1132 (e.g., WLAN/LAN, ZigBee, Wired/Wireless, PAN/BAN/Power Line, BTLE, HAN), one or more protocol handlers 1134, a message handler 1136, and a message cache 1138. The protocol handlers 1134 may facilitate the translation of data received over the multiple communication protocols into a uniform, understandable, and/or useable format. The message handlers 1136 may facilitate the transportation of messages (e.g., between the smart connected devices 1102 and a cloud, etc.). The message cache 1138 may enable increased speed in the retrieval of data. The firewall/proxy 1130 may be configured to drive security and privacy policies.

The network service 1106 may include any number of computing devices (e.g., computers, servers, routers, network switches, etc.) configured to transmit, receive, or relay data (e.g., from smart connected devices 1102 to a public or private cloud-based server, etc.). Network service 1106 may further include any number of hardwired and/or wireless connections. For example, smart connected HVAC equipment 408 and/or smart connected devices 1102 may communicate wirelessly (e.g., using a Wi-Fi, Bluetooth, EnOcean, near field communication (NFC), LoRA, ZigBee, cellular radio, etc.) with a transceiver that is hardwired (e.g., via a fiber optic cable, a CAT5 cable, etc.) to a computing device of network service 1106. Network service 1106 may include services that facilitate managing the wired and/or wireless communication with smart connected HVAC equipment 408 and/or smart connected devices 1102. Network vendors may include, for example, cellular telecommunications providers (e.g., Verizon, T-Mobile, AT&T, etc.), as well as internet service providers. Communications via network service 1106 may leverage enterprise contracts and partnerships to optimize the cost of data transmission. Many network carriers provide a secure connection option as a part of premium services. However, a similar degree of network securities can be achieved via employing trust platform chip in smart connected HVAC equipment 408 and/or smart connected devices 1102 and using encrypted messaging such as AMQP via an Internet-based secure transport.

Figure 12:
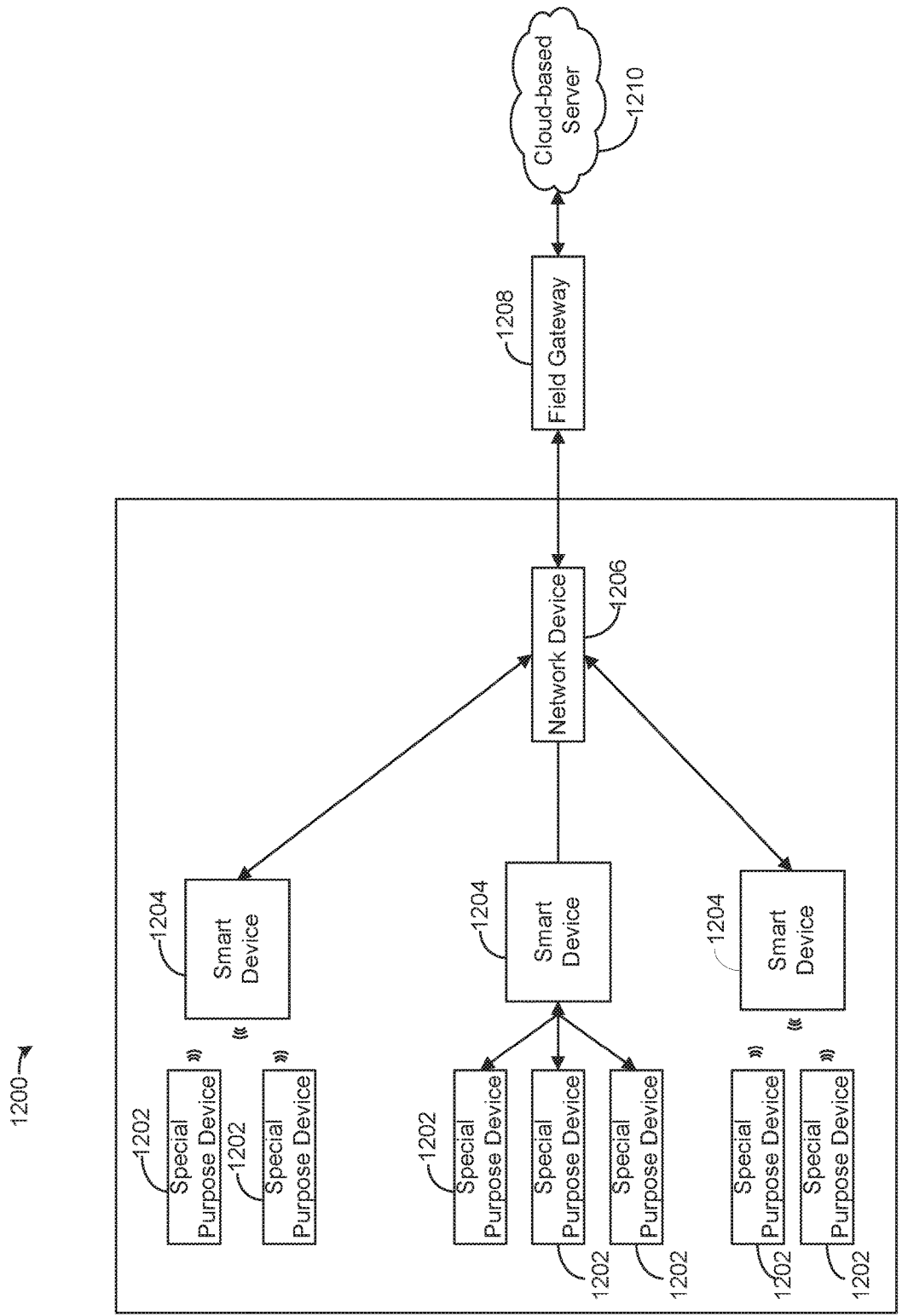
FIG. 12 is a block diagram illustrating a device to cloud connectivity landscape, according to some embodiments.

Referring to FIG. 12, a device (e.g., smart connected devices 1102, smart connected HVAC equipment 408, etc.) to cloud connectivity landscape 1200 is shown according to one embodiment. According to some embodiments, the device to cloud connectivity landscape 1200 leverages devices, gateways, and network services to connect the devices to a cloud. As shown in FIG. 12, the device to cloud connectivity landscape 1200 includes a plurality of special purpose devices, shown as special purpose devices 1202. The special purpose devices 1202 may include sensors, valves, servos, switches, etc. The special purpose devices 1202 may be communicably coupled to one or more smart devices, shown as smart devices 1204. The smart devices 1204 may include a processor with an embedded operating system (e.g., Linux, Android, iOS, RTOS, Windows 10, etc.). The special purpose devices 1202 may communicate with the smart devices 1204 via wired and/or wireless communications protocols (e.g., Wi-Fi, Bluetooth, NFC, ZigBee, etc.). In some embodiments, the smart devices 1204 are included within the special purpose devices 1202.

The smart devices 1204 may be communicably coupled to a network device (e.g., NAT, firewall, router, etc.), shown as network device 1206. The network device 1206 may communicate with the smart devices 1204 via wired and/or wireless communications protocols (e.g., Wi-Fi, Bluetooth, NFC, ZigBee, cellular, etc.). According to one embodiment, the special purpose devices 1202, the smart devices 1204, and the network device 1206 form an internal network. In some embodiments, the connections between the smart devices 1204 and the network device 1206 are initiated and transmitted by the smart devices 1204. In some embodiments, the network device 1206 is capable of initiating a connection with the smart devices 1204 to provide a command and/or update (e.g., from a remote server, a cloud, etc.). The network device 1206 may be communicably coupled to gateway, shown as field gateway 1208. In one embodiment, the field gateway 1208 may have a public IP; address, but be a fully secured and well defensible server platform. In other embodiments, the field gateway 1208 may have a private IP address. The field gateway 1208 may be communicably coupled to a cloud-based server, such as cloud-based server 1210. The cloud-based server 1210 may monitor the special purpose devices 1202 and/or the smart devices 1204. In some embodiments, the cloud-based server 1210 is used to send updates and/or commands to the special purpose devices 1202 and/or smart devices 1204.

Referring back to FIG. 11, the device management technology concept 1108 is shown to include a device identity and access management module 1142, and a device management module 1144. According to one exemplary embodiment, managing the smart connected devices 1102 through the device management technology concept 1108 of the IoT platform 1140 includes four aspects from an identity and access management view point including (i) device provisioning, (ii) device registration, (iii) telemetry ingestion, and (iv) command and control. Device provisioning may include setting up a device to establish a secure, trusted relationship with the digital world. The device management technology concept 1108 may generate a secure key to be assigned to a respective device such that the device is able to interact with the rest of the IoT platform 1140. Regarding device registration, the device management technology concept 1108 may register each device and maintain a list of provisioned devices and associated metadata. Device registration is described in more detail below. Regarding telemetry ingestion, the device management technology concept 1108 may provide a simple, secure path for receiving data from the connected devices. Regarding command and control, the device management technology concept 1108 may provide functionality for securely sending data to a device (e.g., using existing outbound connections, etc.).

Device management technology concept 1108 may also facilitate complete lifecycle management of a device. In some embodiments, the device management technology concept 1108 facilitates tracking a device from manufacture to install. In some embodiments, the device management technology concept 1108 facilitates distributing and licensing device contained software including remote updates for new features, security, and other maintenance type activities. In some embodiments, the device management technology concept 1108 facilitates monitoring the recovery and decommissioning of non-usable devices post useful life. In some embodiments, the device management technology concept 1108 facilitates monitoring the health of a device. In some embodiments, the device management technology concept 1108 facilitates monitoring customer usage patterns, release levels, and maintenance protocols to extract additional business value. The device management technology concept 1108 may provide secure end-to-end connectivity, easy integration into embedded products, simple registration workflow, easy diagnosis and remediation of connectivity problems, remote user access for operation (with the ability to override at LAN), fast and reliable software updates, time series data push, remote write-backs to device via automation, device location tracking, device time sync (with consideration to time zone and automated changes to time zone in events like day light savings), licensing of device and features within the device, rules engine/scheduling of device actions from the cloud, and application program interfaces (APIs) for extension of capabilities in devices and in the cloud.

Data routing and real-time data analytics technology concept 1110 may act as the backend distribution infrastructure of the IoT platform 1140. In one embodiment, the data routing and real-time data analytics technology concept 1110 may be a third party system, such as Kafka, Storm, Event Hub, etc. By way of example, distributed message routing module 1148 of data routing and real-time data analytics technology concept 1110 may be configured to send messages and data elements generated from devices to the correct data platform storage locations. The storage locations (or applications) may use listener applications to receive and process the messages. Distributed message routing 1148 may also act as the front door for event ingestion, and sometimes as a bi-directional control action conduit to the devices or system from which the message events are received.

Figure 13:
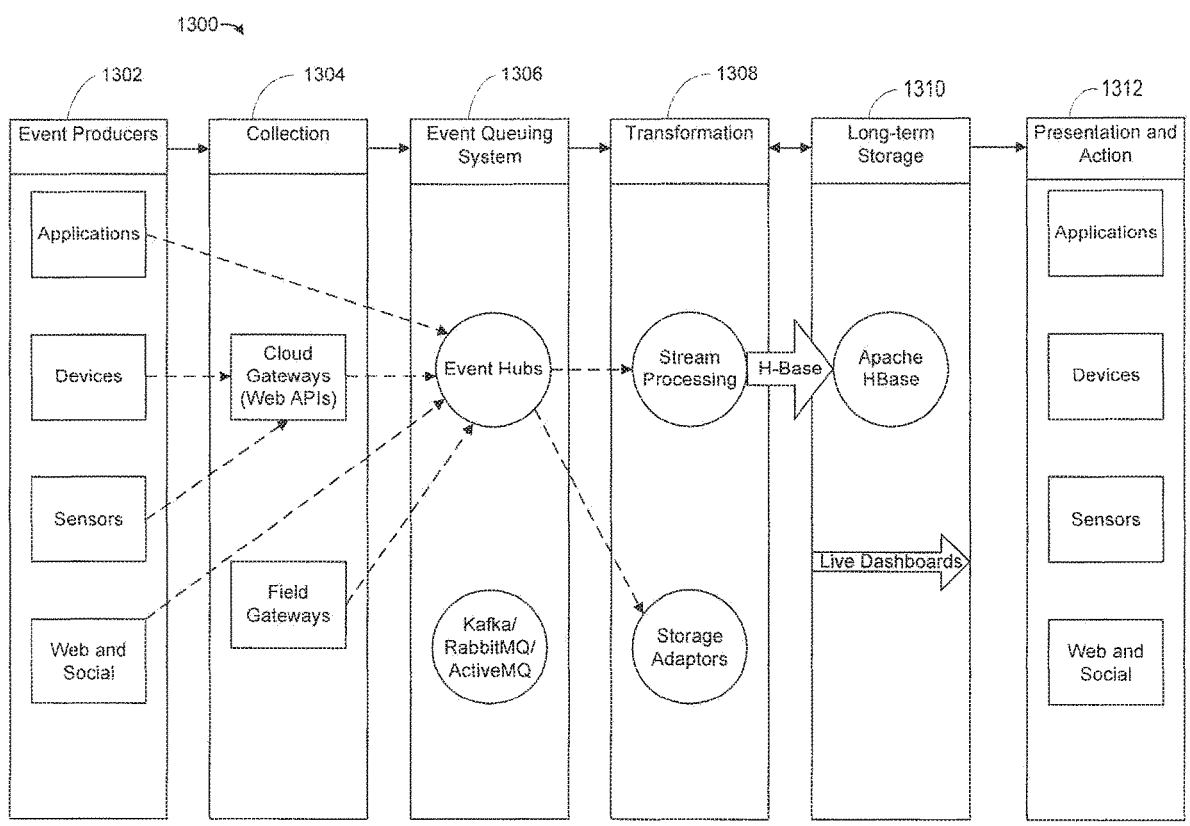
FIG. 13 is a block diagram illustrating a complex event processing mapping, according to some embodiments.

The complex event processing (CEP) module 1146 (e.g., hot path analytics, etc.) may be configured to identify meaningful events and facilitate responding to such events quickly. Anomalies or other patterns may trigger an event in the system such that the CEP module 1146 begins additional processing or implements additional control logic in response thereto. Referring now to FIG. 13, there are multiple steps involved in CEP, as shown by CEP mapping 1300. As shown by CEP mapping 1300, CEP includes multiple steps including event production 1302 (e.g., via applications, devices, sensors, web and social, etc.), collection of data 1304 (e.g., via cloud gateways, field gateways, etc.), queuing of events 1306 (e.g., via event hubs, Kafkam RabbitMQ, ActiveMQ, etc.), transformation of events 1308 (e.g., via stream processing, storage adapters, etc.), preparation for and actual long-term storage 1310, and multi-format presentation of the analyzed events 1312 (e.g., via dashboards, search and query, spreadsheet data analytics, on smart devices, etc.) for reporting and/or other further actions.

In traditional data management and enterprise systems, message routing and event processing types of activities are sequential and spaced by more elaborate classification, cleansing, storage, and analytical steps. Referring back to FIG. 11, the IoT platform 1140 of the present disclosure facilitates receiving simultaneous events or near simultaneous events, taking advantage of early insights from time series data to take immediate remedial actions. The distributed message routing module 1148 may be capable of processing millions of events per second in real-time and in different computing environments to meet the needs of real-time analysis. Distributed message routing 1148 may also involve ingestion, processing, and placing back millions of messages in a message distributor for multiple listener applications to pick up. In some embodiments, the distributed message routing module 1148 performs data transformation and validation.

The data service platform technology concept 1112 may be configured to manage a large quantity of structured, unstructured, and streaming data. A big data processing module 1150 may include a Hadoop distributed files system (HDFS) configured to execute distributed parallel storage using (i) name nodes to track the placement of physical data across various Hadoop instances and (ii) data nodes that physically store the data. The HDFS may allow multiple computing devices (e.g., simple consumer grade computing devices, etc.) to be organized virtually to store large amounts of data. The big data processing module 1150 may also include a Map Reduce function for processing large volumes and transactions of data (e.g., structured, unstructured, and streaming). The Map Reduce function may use parallel distributed algorithms for orchestration of the clustering required for storage and processing of data.

The massive amounts of data may contain different values for different analytics and insights (e.g., data can have different meanings, etc.). This may require the abstraction of data into multiple meanings through a collection of keys and value pairs of the data, which may be achieved through associative arrays. The big data processing module 1150 may include a key-value store for managing such associative arrays through dictionaries and hash. Dictionaries may include a collection of objects and/or records, which have a plurality of different fields within them, each containing data. Such objects and/or records may be stored and retrieved using a key that uniquely identifies the object and/or record such that the key may be used to quickly locate the data within the database.

The big data processing module 1150 may additionally or alternatively include graph databases or graph stores that use graph structures for semantic queries with nodes (e.g., entities, etc.), properties (e.g., information about the entities, etc.), and edges (e.g., a connection between the nodes and properties, etc.) to store the data. The big data processing module 1150 may additionally or alternatively include Spark. According to some embodiments, Spark is an open source cluster computing framework built using multi-stage in-memory primitives. Spark may accelerate processing performance by order of magnitude and may be complementary to machine learning of the IoT platform 1140.

The data service platform technology concept 1112 may further include a relational database management system (RDBMS) 1152 may be useful for storing data associated with applications that have low latency data retrieval needs, as the RDBMS 1152 has a natural low latency. For example, consumer-end or front-end applications traditionally have low latency data retrieval needs. Thus, the data associated with such applications may be stored in the RDBMS 1152, rather than by big data processing module 1150. The data stored in the RDBMS 1152 may be parsed, transformed, and/or enriched prior to storages in RDBMS 1152.

A data integration module1154 facilitates connecting and collecting data (e.g., structured data, unstructured data, streaming data, etc.) from almost any type of device (e.g., smart connected devices 1102, smart connected HVAC equipment 408, etc.). The format of the collected data may vary greatly from device to device. The data integration module 1154 is configured to process the collected data such that the data is stored in a native state or substantially the native state of the data as collected (e.g., as the native state may be used and analyzed differently later, etc.). The data integration module 1154 may use asynchronous communication to collect the data (e.g., making the integration of the data simpler, etc.). Layers of abstraction may be used during any processing or further storage. The data integration module 1154 may additionally provide an ease of semantic mediation of the collected data (e.g., such that the IoT platform 1140 may use the data in a meaningful way, etc.). According to one embodiment, the data integration module 1154 includes a plurality of microservices that form the integration fabric. In some embodiments, the data integration module 1154 is independent of the other components of data service platform 1112.

Analytics technology concept 1114 may include a massively parallel data analytics module 1158. The massively parallel data analytics module 1158 may include multiple processors configured to run analytical processing. The massively parallel data analytics module 1158 may divide large data sets into smaller segments that are analyzed (e.g., operated on, etc.) by specifically assigned processors (e.g., with their own operating system and memory, etc.). Messaging interfaces may aggregate the results following the analysis by each processor. Such a system may allow for improvements in processing and flexible scalability.

The IoT platform 1140 increases the capabilities to collect real-time operational and/or performance data from devices and/or machines (e.g., at very frequent intervals, continuously, etc.). A time series analysis module 1164 within the analytics technology concept 1114 may be configured to receive large quantities of streaming time series data for analysis. The time series analysis module 1164 may analyze time series data over a time domain and/or a frequency domain. The time series analysis module 1164 may use such analysis to forecast future events and/or identify trends. The time series analysis module 1164 may combine multiple parameters from the time series data and environmental and/or influence data for fault detection and diagnostics (FDD). The IoT platform 1140 may facilitate the use of automated FDD due to the vast availability of data capable of being received by, stored, and processed by the various components of the IoT platform 1140. FDD analysis may include rule based FDD analysis, model based FDD analysis, and/or case based FDD analysis, among other possibilities. Rules based FDD analysis may use boundary conditions of observed data to detect and isolate faults (e.g., using simple or complex if/then/else/hence logic blocks or structures, etc.). Model based FDD analysis may use different types of statistical models in a more applied analysis. Case based FDD analysis may use past situation-solution examples to adapt to new and/or similar situations such that new behaviors are learnt over time (e.g. adaptive learning, etc.) by modifying analytical parameters.

The analytics technology concept 1114 may further include a machine learning module 1166. The machine learning module 1166 may be configured to use data mining techniques and/or other learning algorithms to build models to interpret various data received from the various devices or components (e.g., smart devices, smart connected devices 1102, smart connected HVAC equipment 408, etc.) to detect, classify, and/or predict future outcomes. Such learning algorithms may be associated with rule learning, artificial neural networks, inductive logic programming, and/or clustering and Bayesian networks. The machine learning module 1166 may solve complex problems, predict scenarios not previously modeled, and/or develop new insights through the use of statistical methods to self-identify algorithms for analysis and association. The machine learning module 1166 may be executed either through custom programming and/or usage of standard or open source tools (e.g., such as SicKit, Spark's machine learning, etc.).

The analytics technology concept 1114 may further include an advanced data mining module 1162. The advanced data mining module 1162 may use statistical data analysis, as well as other algorithmic methods, to find patterns within data. The statistical data analysis may include statistical approaches involving regression analysis, neural networks, and/or decision trees. The advanced data mining module 1162 may apply certain techniques including association rules for initial data exploration, fuzzy data mining approaches, rough set models, support vector machines, and genetic algorithms to solve special problems. The advanced data mining module 1162 may be used in a wide array of industries to solve number of complex issues and/or generate insights, which involves the interplay of multiple different types/classes of data that may not have obvious associations. The advanced data mining module 1162 may apply methodologies including Cross-Industry Standard Process for Data Mining (CRISP-DM) and/or Sample-Explore-Modify-Model-Assess (SEMMA). Such methodologies may be applied in an iterative cycle by advanced data mining 1162 to provide a better analysis.

The analytics technology concept 1114 may further include a business intelligence module 1160. The business intelligence module 1160 may be configured to enable the easy creation and access to dashboards and analytics across multiple data sources and types. Business intelligence module 1160 may be further configured to facilitate creating packages of content (e.g., data, analytics, etc.) for distribution to other users (e.g., in the same organization, in the same industry, visualization for the masses, etc.). Such distribution may allow others to conduct independent analytics on the content and/or create independent dashboards and/or reports. The content may be delivered through multiple channels including desktop, mobile, and/or web.

Referring still to FIG. 11, the ecosystem 1100 is shown to include a delivery technology concept 1116. The delivery technology concept 1116 is related to channel and distribution strategy and is shown to include a delivery applications module 1168, a data visualization module 1170, a product distribution module 1172, an application service API module 1174 and an integration to enterprise applications module 1176. The product distribution module 1172 may include off-line distribution of IoT related products, services, and on-line distribution of solutions for a certain customer and/or a market (e.g., delivery applications module 1168). The application service API module 1174 may be provided to app developers to deliver information products. The data visualization module 1170 and exploration tools may be used for rapid delivery. The delivery technology concept 1116 may include integration to one or more enterprise applications module 1176.

Ecosystem 1100 is shown to further include the business/operation support technology concept 1118. The business/operation support technology concept 1118 may facilitate the integration and optimization of devices to unite interrelated applications. The business/operation support technology concept 1118 may provide capabilities for customer management, managing partners who are contributors to IoT platform 1140, managing commercial transactions, business reporting, and financial reporting. For example, if the IoT platform 1140 includes financial transaction services, then CRM, ERP and/or financial payment service integration may be used. The business/operation support technology concept 1118 may further include business applications such as a customer management applications module 1178 (e.g., CRM, etc.), a partner management applications module 1180, a billing module 1182, a reporting applications module 1184, and an ERP module 1186. The reporting application module 1184 may be configured to facilitate providing the data from IoT platform 1140 to outside businesses (e.g., insurance companies, utility providers, governmental agencies, etc.) that may have an interest in such data. The business/operation support technology concept 1118 may allow a manufacturer to leverage IoT enabled product related data such as install base information, operational performance data, maintenance history, etc. to attract new service providers (e.g., who may be intermediate customers, etc.).

The Ecosystem 1100 is further shown to include security, privacy, access control, and compliance management technology concept 1190. Multi-layered and multi-dimensional intrusion detection and prevention mechanisms may provide security at the device level, the data level, the network level, and/or the application level. The same intelligence that enables devices to perform their tasks may also enable them to recognize and counteract threats. This does not require an evolutionary approach, but rather an evolution of measures that have proven successful in IT networks, adapted to the challenges of IoT and to the constraints of connected devices. At any given point in time, IoT platform 1140 may support multiple users and stake holders including building owners, building operators, tenants, service technicians, manufacturers, and the like. Remote accessibility of connected products may involve complex identity management through a unified login and product management experience. For example, a single login may allow a customer to sign on to all connected products and services associated with IoT platform 1140.

The security, privacy, access control, and compliance management technology concept 1190 may provide encryption for data and connections at some or all stages. Each device and/or every data transaction associated with the IoT platform 1140 may have a unique identity which may provide easy traceability and enable authentication. The security, privacy, access control, and compliance management technology concept 1190 may provide perimeter protection, intrusion detection, and/or response and audit trails (e.g., at real-time speed, etc.). The security, privacy, access control, and compliance management technology concept 1190 may be able to isolate any non-secure device and/or connection, and/or have a mechanism to accept such non-secure device and/or connection with calculated risks. The security, privacy, access control, and compliance management technology concept 1190 may have mechanisms to detect pattern anomalies in device connectivity, network traffic, and/or data communication (e.g., instant indicators of a possible intrusion, etc.). The security, privacy, access control, and compliance management technology concept1190 may comply with various standards including, but not limited to, ISO/IEC 27001, NIST 800-82 v2, RFC2196, and/or ISA/IEC-62443.

There may be many different actors or personas involved with IoT platform 1140 with different data access needs including the devices and sensors themselves, manufacturers of such devices and sensors, installers, owners, users, maintainers, application service providers, technology platform providers, cloud hosting providers, etc. Security, privacy, access control, and compliance management technology concept 1190 may provide each of these actors with different action rights to the data (e.g., who has access to what data, what actions may one take with the data generated, etc.).

Figure 14:
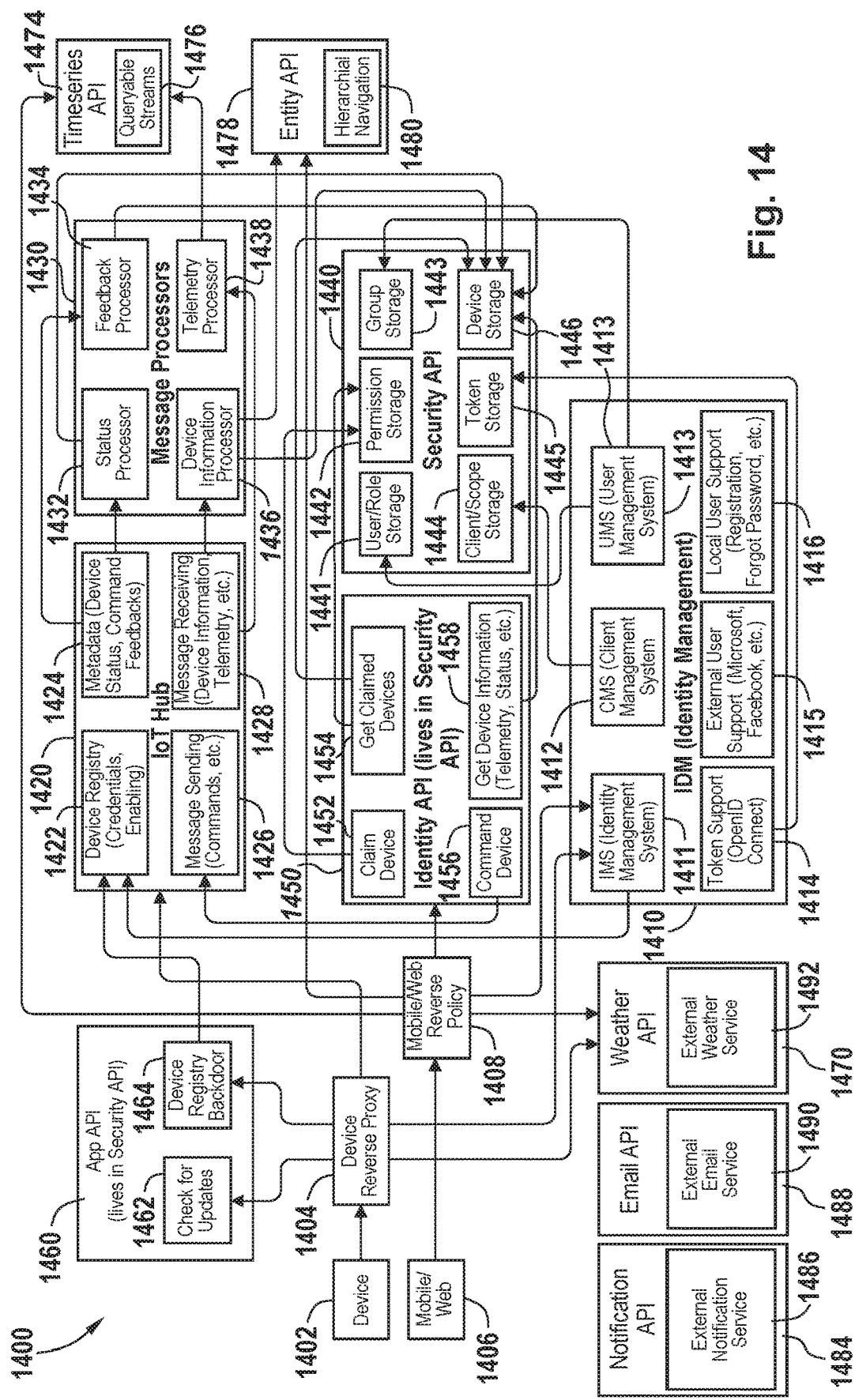
FIG. 14 is block diagram of a data platform, according to some embodiments.

Referring now to FIG. 14, a data platform 1400 (e.g., for the IoT platform 1140, etc.) is shown according to one embodiment. As shown in FIG. 14, the data platform 1400 includes a device 1402 (e.g. an on-premises device, a smart connected device 1102, an HVAC equipment 408, etc.) communicably coupled to a device reverse proxy 1404 and a mobile/web reverse proxy 1408. The device reverse proxy 1404 and the mobile/web reverse proxy 1408 may further be communicably coupled to a mobile/web device 1406 (e.g., an off-premises device, etc.). Additionally, the device reverse proxy 1404 and the mobile/web reverse proxy 1408 also may be communicatively coupled, respectively, to one or more components and/or application program interfaces (APIs) of the data platform 1400. As shown in FIG. 14, the one or more components and/or APIs of the data platform 1400 include an identity management (IDM) component 1410, an IoT hub 1420, one or more message processors 1430 (e.g., status processor 1432, feedback processor 1434, device information processor 1436, telemetry processor 1438), a security API 1440, an identity API 1450 and an application API 1460, a weather API 1470, a time series API 1474, an entity API 1478, a notification API 1484, and an email API 1488.

As an overview, data platform 1400 may be a collection of services which collect and serve up building objects and time series data. Points in the entity API 1478 may contain time series objects which include an ID and sample Url. The ID and sample Url in the time series object may be used to query time series API 1474. Parts of time series API 1474 may allow a user to query by space or system. In this case, the time series API 1474 may look up the corresponding time series objects in the entity API 1478. To use the time series API 1474 and/or the entity API 1478, an action token may need to be acquired (e.g., from the IDM component 1410) for authentication and authorization. Various HTTP verbs may be used with data platform 1400 to perform various actions including GET, POST, PUT, PATCH, and DELETE. GET may be used to read from an API. POST may be used to create an item or to execute an action. PUT may be used to update an item, or create an item if it does not exist. PATCH may be used to update specific properties of an item. DELETE may be used to delete a single item (or a cascading delete when deleting points, as associate time series may also be deleted).

As show in FIG. 14, the IDM component 1410 includes an identity management system (IMS) 1411, a client management system (CMS) 1412, a user management system (UMS) 1413, a token support module 1414 (e.g., for OpenID connect, etc.), an external user support module 1415 (e.g., Microsoft, Facebook, etc.), and a local user support module 1416 (e.g., registration, forgotten password, etc.). According to an exemplary embodiment, AIS 1411 is configured to implement an OpenID Connect protocol which is an identity layer on top of OAuth 2.0 protocol. The OpenID connect protocol allows clients to verify the identity of an end-user based on the authentication performed by an authorization server, as well as to obtain basic profile information about the end-user in an interoperable and rest-like manner. The OpenID Connect protocol allows clients of all types, including Web-based, mobile, and JavaScript clients, to request and receive information about authenticated sessions and end-users. The specification suite is extensible, allowing participants to use optional features such as encryption of identity data, discovery of Open ID providers, and session management. OAuth 2.0 protocol focuses on client developer simplicity while providing specific authorization flows for web applications, desktop applications, mobile phones, and living room devices. IMS 1411 may use IdentityServer3 (e.g., a .NET/Katana-based framework and hostable component) for implementing the protocol.

IMS 1411 may be configured to restrict web services to unauthorized users and applications. Such restriction may be based on a user's tokens. Tokens may represent a set of claims that may be used to restrict a client's permissions when using an IMS-secured endpoint (e.g., such as an HTTP API, etc.). Tokens may be requested from IMS 1411 by clients. Clients may send the tokens to any IMS-secured endpoint (e.g., using Bearer authorization in an HTTP Authorization header for HTTP-based APIs, etc.). The tokens may be good for a preset time duration (e.g., one hour, thirty minutes, two hours, etc.).

As show in FIG. 14, the security API 1440 includes user/role storage 1441, permission storage 1442, group storage 1443, client/scope storage 1444, token storage 1445, and device storage 1446. Security API 1440 may also communicate with the identity API 1450. The identity API 1450 can include a claim device module 1452, a get claimed devices module 1454, a command device 1456, and a get device information module 1458. The application API 1460 may include a check for updates module 1462 and a device registry backdoor module 1464. According to one embodiment, the security API 1440 is configured to manage users, roles, groups, devices, and/or relationships therebetween. In some embodiments, a PostgreSQL database is used for storing such data (e.g., in an on-premises scenario). In some embodiments, a variety of technologies are used including, but not limited to, Azure Active Directory, Azure IoT Hub, Azure DocumentDB, and/or Azure Tables (e.g., in a cloud scenario).

The user/role storage module 1441 may be configured to store data and/or information relating to users and/or roles. A user may effectively represent an individual identity usable in the data platform 1400. An example of information stored in the user/role storage module1441 relating to a user is shown in Table 1. A role may effectively represent a collection of permissions for a user or a group. Each API in the data platform 1400 may have different interpretations for roles. An example of information stored in user/role storage 1441 relating to a role is shown in Table 2. Group storage 1443 may be configured to store data and/or information relating to a group. A group may effectively represent a collection of users and/or devices in the data platform 1400. An example of information stored in the group storage 1443 relating to a group is shown in Table 3. Device storage 1446 may be configured to store data and/or information relating to a device. A device may facilitate interaction with the IoT Hub 1420 such that metadata and commands may be defined for a device. An example of information stored in the device storage 1446 relating to a device is shown in Table 4

TABLE 1

Users

| Property | Type | Description |
|---|---|---|
| Id | String | Friendly identifier. Identifies the username for locally authenticated users and a crafted representation of a username for externally authenticated users. |
| Subject | String | A consistent identifier that is usually a GUID. Useful when deleting and recreating an identical representation to distinguish between the previous one and the new one. |
| Username | String | A secondary Id property. Needed when updating Id. |
| Credentials | JSON Object | Contains properties related to the user's credentials such as an encrypted password and a cryptography algorithm. |
| Identity | JSON Object | Contains properties related to the user's identity such as name, phone, email, and extra information retrieved from external identity providers. |
| Meta | JSON Object | Contains properties related to the user's metadata such as verification status, failed attempts, and various dates. |
| Privilege | JSON Object | Contains properties related to the user's privilege such as roles and permissions. |

TABLE 2

Roles

| Property | Type | Description |
|---|---|---|
| Id | String | Friendly identifier. Identifies the name of the role. |
| Subject | String | A consistent identifier that is usually a GUID. Useful when deleting and recreating an identical representation to distinguish between the previous one and the new one. |
| Name | String | A secondary Id property. Needed when updating Id. |
| Description | String | Describes the purpose of the role. |

TABLE 3

Groups

| Property | Type | Description |
|---|---|---|
| Id | String | Friendly identifier. Identifies the name of the group. |
| Subject | String | A consistent identifier that is usually a GUID. This is useful when deleting and recreating an identical representation to distinguish between the previous one and the new one. |
| Name | String | A secondary Id property. Needed when updating Id. |
| Description | String | Describes the purpose of the group. |
| Members | JSON Object | Contains properties related to the group's members such as users and devices. |
| Privilege | JSON Object | Contains properties related to the group's privilege such as roles and permissions. |

TABLE 4

Devices

| Property | Type | Description |
|---|---|---|
| Id | String | Friendly identifier. Identifies the device name in IoT Hub. |
| PrimaryKey | Base64 String | Used to securely communicate to IoT Hub. If omitted on creation, the API will generate one. |
| SecondaryKey | Base64 String | Used when changing the PrimaryKey, but is not needed for general communication. If omitted, the API will generate one. |
| Properties | JSON Object | Used to store any metadata for the device. |
| Commands | JSON Array | Used to define supported commands for the device. |
| Telemetries | JSON Array | Used to show mapped telemetries for the device. |
| Status | JSON Object | Used to show the status for the device. |

The weather API 1470 is configured to communicate with one or more external weather providers 1492 (e.g., Aeris Weather, etc.). Such communication may facilitate integrating weather information (e.g., current weather data, weather forecasts, historical data, based on location such as country, state, and/or zip code, etc.) into web and/or mobile applications. Weather API 1470 may automatically append the correct security credentials using the IMS token claims.

The entity API 1478 (e.g., having hierarchical navigation 1480) includes entities including organizations, spaces, systems, points, time series, and data sources. According to an exemplary embodiment, the entities are open types such that each supports dynamic properties. The entities have the properties shown in Table 5.

TABLE 5

Entities

| property | type | description |
| --- | --- | --- |
| id | string | Unique identifier. Limited to alphanumeric characters, "_", "-", "~", and ".". We recommend using GUIDs. |
| name | string | |
| description | string | |
| image | string | A base64 encoded image. This is validated by converting the base64 string to bytes and attempting to create a System.Drawing.Image. Supported formats: BMP, GIF, JPEG, PNG, TIFF. |
| entityTemplate | EntityTemplate | Optional. The entityTemplate describes an entity type. When omitted, the entity is "generic".<br>The entityTemplate describes the expected dynamic properties and related entities.<br>Entity templates replace the deprecated systemType, spaceType, and pointRole properties. |
| entityTemplateId | | This property is provided for convenience so you do not need to expand the entityTemplate to find the id. |
| DynamicProperties | | Everything derived from Entity is an open type, meaning it supports dynamic properties. |
| createdDateUtc | DateTime | The date and time this entity was created. |
| modifiedDateUtc | DateTime | The date and time this entity was modified. |

An entity can have an associated entity template. The entity template indicates the "type" of the entity and may have additional metadata as well. Entity templates may have all of the properties of the entities (see Table 5), as well as the properties shown in Tables 6-8.

TABLE 6

Entity Templates

| property | type | description |
| --- | --- | --- |
| baseEntity | string | Point, System, Space, or Organization |

TABLE 6-continued

Entity Templates

| property | type | description |
| --- | --- | --- |
| properties | Collection (Jci.Be.Data.PropertyMetadata) | See Table 7 |
| relationships | Collection (Jci.Be.Data.RelationshipMetadata) | See Table 8 |

TABLE 7

Property Metadata

| property | type | description |
| --- | --- | --- |
| name | string | The name of the dynamic property. |
| description | string | An optional description. |
| odataType | string | The OData type of the property value. The default odataType is String. The primitive types are: Byte, Short (Int16), Integer (Int32), Long (Int64), Double, Decimal, Boolean, Date, Char, String.<br>For properties that represent a collection of values, the odataType is the element type enclosed in parentheses and prefixed with "Collection". For example: "Collection(String)" |
| required | boolean | If true, the application should require this property to be populated. |

TABLE 8

Relationship Metadata

| property | type | description |
| --- | --- | --- |
| navigationProperty | string | The name of the navigation property this metadata applies to. |
| expectedTemplates | Collection (Jci.Be.Data.EntityTemplate) | The templates in this list are the expected templates for entities referenced by the navigation property. |
| allowOtherTypes | boolean | If false, entities references by this navigation property should only use one of the expectedTemplates and should not be generic entities without a define entityTemplate. |

Organizations may include a company, tenant, and/or another group of people that occupy and/or own a space. Organizations may have all of the properties of the entities (see Table 5), as well as the properties shown in Table 9.

TABLE 9

| | Organizations | |
|---|---|---|
| property | type | description |
| reportingCurrency | string | Applications may use a dynamic property instead. The currency is the units id of a unit with quantity = currency. |
| reportingDateFormat | string | Applications may use a dynamic property instead. Date formats are up to the application and are not validated by the EntityAPI. |
| reportingUnitsIds | ReportingUnits[ ] | Applications may use a dynamic property instead. An array of quantity, commodity, and unitsId. For example:<br>"reportingUnitsIds": [<br>    {"quantity":"power", "commodity":null, "unitsId":"kilowatts"},<br>    {"quantity":"energy", "commodity":"Electricity", "unitsId":"kilowatt-hours"},<br>    {"quantity":"energy", "commodity":"Energy", "unitsId":"British-thermal-units"},<br>    {"quantity":"volume", "commodity":"NaturalGas", "unitsId":"standard-cubic-foot"},<br>    {"quantity":"volume", "commodity":"LiquidPropane", "unitsId":"us-gallons"},<br>    {"quantity":"area", "commodity":null, "unitsId":"square-feet"},<br>    {"quantity":"pressure", "commodity":null, "unitsId":"inches-of-water"},<br>    {"quantity":"currency", "commodity":null, "unitsId":"USD"}<br>]<br>A given quantity and commodity combination can only appear in the list once. |
| parent | Organization | A navigation property linking this organization to its parent. |
| parentId | string | The parent id. Read-only. |
| contains | Organization[ ] | A derived (read-only) navigation property. A list of organizations which have this organization as its parent. |
| owns | Space[ ] | This may be omitted. A derived (read-only) navigation property. A list of spaces which are owned by this organization. |
| occupies | Space[ ] | A derived (read-only) navigation property. A list of spaces which are occupied by this organization. |
| dataSources | DataSource[ ] | A derived (read-only) navigation property. A list of data sources which are associated with this organization. |
| parentAncestors | Organization[ ] | A derived (read-only) navigation property. A list of all organizations that can be reached by following Organization.parent relationships. |
| containsDescendents | Organization[ ] | A derived (read-only) navigation property. A list of organizations that can be reached by following the Organization.contains relationships. |
| usesSystems | System[ ] | A derived (read-only) navigation property. A list of systems where the system usedByOrganization property references this organization. |

Spaces may include sites, building, and/or areas of a building. Spaces may have all of the properties of the entities (see Table 5), as well as the properties shown in Table 10.

TABLE 10

| | Spaces | |
|---|---|---|
| property | type | description |
| spaceType | string | May use entityTemplateId instead. Possible values: Region, Site, Campus, Facility, Building, Wing, Floor, Room, Suite, Zone |
| use | string | Applications may use a dynamic property instead. Used to categorize spaces, especially buildings.eb; normal |

TABLE 10-continued

Spaces

| property | type | description |
|---|---|---|
| location | Complex object | |
| area | double | |
| areaUnitsId | string | |
| locatedIn | Space | |
| locatedInId | string | The space id for the locatedIn space. Read-only. |
| ownedBy | Organization | This may be omitted. |
| ownedById | string | This may be omitted. The organization id for the owned by organization. Read-only. |
| occupiedBy | Organization | |
| occupiedById | string | The organization id for the occupied by organization. Read-only. |
| points | Points[ ] | This may be omitted. These points are directly associated with the space. |
| servedBySystems | System[ ] | A derived (read-only) navigation property. A list of systems whose list of servesSpaces includes this space. |
| containsSystems | System[ ] | May use servedBySystems instead. A derived (read-only) navigation property. A list of systems which are directly located in this space (immediate children). |
| containsSpaces | Space[ ] | A derived (read-only) navigation property. A list of spaces which are directly located in this space (immediate children). |
| ancestorSpaces | Space[ ] | May use locatedInAncestors instead. |
| locatedInAncestors | Space[ ] | A derived (read-only) navigation property. A list of spaces that this space is located in. This is the transitive closure of the spaces reachable from the locatedIn relationships. |
| descendentSpaces | Space[ ] | May use containsSpacesDescendents instead. |
| containsSpacesDescendents | Space[ ] | A derived (read-only) navigation property. A list of spaces contained by this space. This is the transitive closure of the spaces reachable from the containsSpaces relationships. |
| descendentSystems | System[ ] | May use servedBySystemsDescendents instead. |
| servedBySystemsDescendents | System[ ] | A derived (read-only) navigation property. A list of systems serving this space and contained spaces and their subsystems. This is the transitive closure of systems reachable from the containsSpaces, servedBySystems and subsystems relationships. |
| ownedByAncestors | Organization[ ] | A derived (read-only) navigation property. A list of Organizations that can be reached by following the Space.ownedBy and Organization.parent relationships. |
| occupiedByAncestors | Organization[ ] | A derived (read-only) navigation property. A list of Organizations that can be reached by following the Space.locatedIn, Space.occupiedBy and Organization.parent relationships. |

Systems may include energy, HVAC, and/or other control systems. Systems can be nested. For example, a main meter could have a subsystem which are sub-meters. Systems may have all of the properties of the entities (see Table 5), as well as the properties shown in Table 11.

TABLE 11

Systems

| property | type | description |
|---|---|---|
| systemType | string | May use entityTemplateId instead. Possible values: GenericEquipment, Meter, AirHandlingUnit, VayBox, RooftopUnit, CRAC, Chiller, ChilledBeam, Boiler, HeatExchanger, Humidifier, Plant, Pump, VariableSpeedDrive, Fan, VariableFrequencyDrive, UnitVentilator, HeatPump, FumeHood, FanCoilUnit, WeatherStation, NetworkDevice, FieldBus |

TABLE 11-continued

| | Systems | |
|---|---|---|
| property | type | description |
| locatedIn | Space | May use servesSpaces instead. The space that this system is physically located in. |
| partOf | System | The system that this system is part of. |
| partOfId | string | The system id of the partOf system. Read-only. |
| dataSource | DataSource | The data source that defined this system. |
| dataSourceId | string | The data source id. Read-only. |
| points | Points[ ] | A list of points used by this system. |
| servesSpaces | Space[ ] | A list of spaces that this system directly serves. |
| subSystems | System[ ] | A derived (read-only) navigation property. This is the list of systems which are part of this system. |
| ancestorSpaces | Space[ ] | May use servesSpacesAncestors instead. |
| servesSpacesAncestors | Space[ ] | A derived (read-only) navigation property. A list of spaces that this system serves. This is the transitive closure of the spaces reachable from the System.partOf, System.servesSpaces and Space.locatedIn relationships. |
| descendentSystems | System[ ] | May use subSystemDescendents instead. |
| subSystemDescendents | System[ ] | A derived (read-only) navigation property. A list of subsystems. This is the transitive closure of systems reachable from the subsystems relationships. |
| partOfAncestors | System[ ] | A derived (read-only) navigation property. A list of Systems that can be reached by following the System.partOf relationships. |
| usedByOrganization | Organization | The organization that directly uses this system. This is to allow virtual systems (with calculated points) to be associated with organizations. |

Points may identify a single value in a building automation system (BAS) that is being monitored. The points may have a native reference which is a BAS identifier. A point's source is defined as online, offline, or virtual. An online point may receive its data form the BAS. An offline point may get its data through a user interface (UI). A virtual point may be calculated dynamically. Online and offline points may have a time series with a raw transformation type. Virtual points may have a time series with a custom expression transformation type. A point may have one time series for each transformation type. Points may have all of the properties of the entities (see Table 5), as well as the properties shown in Table 12.

TABLE 12

| | Points | |
|---|---|---|
| property | type | description |
| source | string | Possible values:<br>online—gets its values from the BAS<br>offline—gets its values imported by the user<br>virtual—calculated values<br>baseline—baseline data |
| nativeReference | string | |
| pointRole | string | May use entityTemplateId instead.<br>Must be one of the PointRole enumeration values. |
| classId | int | The Metasys or BACnet classid. |
| dataSource | DataSource | |
| dataSourceId | string | The dataSource id. Read-only. |
| commodityName | string | May use a dynamic property instead.<br>Possible values:<br>Undefined, Electricity, NaturalGas, Chilled Water, HotWater, Steam, Water, Sewage, LiquidPropane, FuelOilHomeHeating, FuelOilCommercialHeating, FuelOilResidual, Diesel, Coal, Energy |
| minValue | double | The minimum value allowed for this point. Values below the minimum may be discarded. |
| maxValue | double | The maximum value allowed for this point. Values above the maximum may be discarded. |
| resetValue | double | The value at which a meter consumption value resets to zero. |
| nativeEnumId | string | The native identifier for the enumeration from the underlying system. Null if this point is not an enumeration value. |
| unitsId | string | The unit of measure for the raw values for this point. |
| customTransformExpression | string | The CustomTransform Expression provides the formula used to compute the values for this point. |

TABLE 12-continued

Points

| property | type | description |
|---|---|---|
| usedBySystems | System[ ] | A derived (read-only) navigation property. A list of systems which use this point. |
| usedBySpaces | Space[ ] | A derived (read-only) navigation property. A list of spaces which use this point. |
| time series | Time series[ ] | A derived (read-only) navigation property. A list of time series for this point. |

Time series may have all of the properties of the entities (see Table 5), as well as the properties shown in Table 13.

TABLE 13

Time Series

| property | type | description |
|---|---|---|
| sourceTime seriesId | string | The time series that this time series was derived from. |
| seriesType | string | Possible Values: Cumulative, Interval, Instantaneous |
| intervalMinutes | int | Obsolete |
| dataType | string | All samples in the time series may be stored as double. The DataType field describes the native data type. |
| transformationType | string | A point may have either a Raw or CustomExpression time series. The other transformation types are derived from this base time series. Possible Values: Raw, BoundsLimited, AverageQuarterHour, AverageHourly, AverageDaily, AverageMonthly, AverageYearly, TotalQuarterHour, TotalHourly, TotalDaily, TotalMonthly, TotalYearly, DeltaQuarterHour, DeltaHourly, DeltaDaily, DeltaMonthly, DeltaYearly, CustomExpression |
| rollupInterval | string | A read-only value derived from the transformationType which describes the periodicity of the samples in this time series. |
| customTransformExpression | string | When the transformationType is set to "CustomExpression", the CustomTransformExpression field provides the formula used to compute the values for this time series. |
| unitsId | string | The units of measure for the values in this time series. |
| samplesUrl | string | A read-only value the give you a base URL to query the time series API with. |
| point | Point | Required. The point this time series belongs to. |
| pointId | string | The point id. Read-only. |

When a transformation type property is set to "CustomExpression" on a time series entity, a custom transform expression property may hold an expression that is evaluated every time a new source sample is added to time series API 1474. For example, the custom expression 'point("ID1")+point("ID2")' may add the value of the samples for point ID1 and point ID2 when a new sample is added to Time Series API 1474 for either point. The result of this calculation is then stored with the time series id of the time series that holds the custom expression.

A data source is the BAS or other source for the entity configuration. The drivers in the data collector may be the data sources for Metasys by Johnson Control, Inc., FX, and BACnet. Data sources may have all of the properties of the entities (see Table 5), as well as the properties shown in Table 14.

TABLE 14

Data Sources

| property | Type | description |
|---|---|---|
| configurationDiscoveryFilter | string | |
| configurationDiscoveryStatus | string | Possible Values: Requested, Started, Finished |
| connectionStatus | string | Possible Values: Unknown, ConnectionTestRequested, ConnectionTestStarted, ConnectionTestFailed, ConnectionTestSucceeded |

TABLE 14-continued

Data Sources

| property | Type | description |
| --- | --- | --- |
| connectionTestDate | DateTimeOffset | The date and time the connection test started or finished. |
| host | string | Host name or IP address |
| port | int | Port number |
| deviceNbr | int | Device Number |
| username | string | |
| password | string | |
| dataSourceType | string | |
| organization | Organization | |
| points | Point[ ] | A derived (read-only) navigation property. A list of points associated with this data source. |
| systems | System[ ] | A derived (read-only) navigation property. A list of systems associated with this data source. |

A units endpoint may list units of measure. Units may have all of the properties of the entities (see Table 5), as well as the properties shown in Table 15.

TABLE 15

Units

| property | type | description |
| --- | --- | --- |
| symbol | string | |
| alias | string | An alternate symbol |
| quantity | string | A way of categorizing units to identify units which can be converted to one another. Possible values: unknown, acceleration, area, currency, capacitance, current, electric_conductance, electric_resistance, energy, entropy, force, frequency, illuminance, inductance, information, length, luminous_flux, luminous_intensity, magnetic_flux, magnetic_flux_density, mass, mass_flow, other, plane_angle, power, pressure, specific_energy, temperature, time, velocity, voltage, volume, volumetric_flow |
| measureType | string | The Metasys categories for units which are not as detailed as quantity. |
| unitSystem | string | Primary unit system the units belong to. SI, US, metric, Imperial, and other values |
| metasysUnitsCode | string | Equivalent Metasys units code |
| metasysUnitsId | int | Equivalent Metasys units id |

Figure 15:
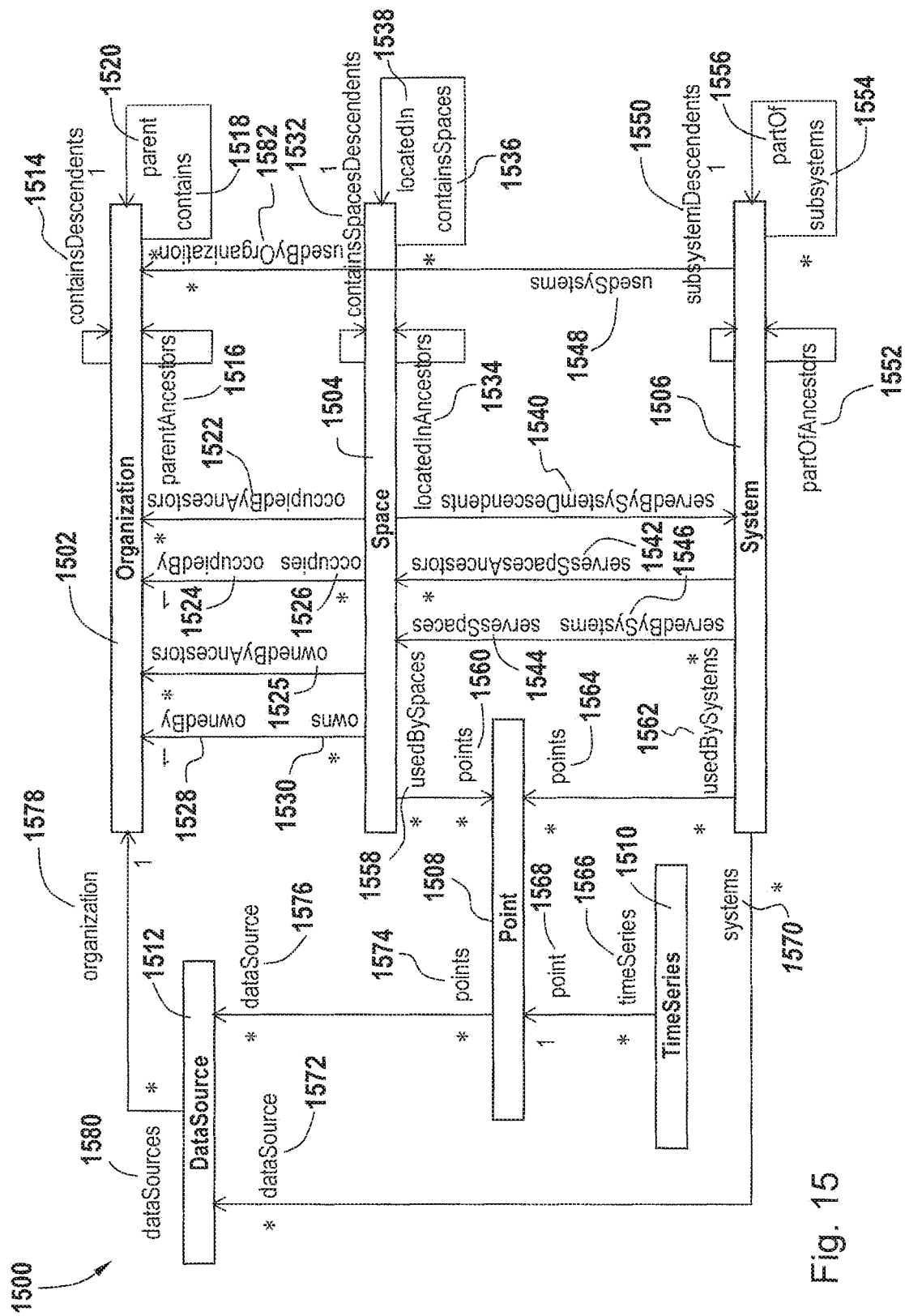
FIG. 15 is an entity graph illustrating relationships between an organization, a space, a system, a point, a time series, and a data source, according to some embodiments.

Referring now to FIG. 15, an entity graph 1500 is shown, according to some embodiments. In some embodiments, entity graph 1500 is generated or used by the entity API 1478, as described with reference to FIG. 14. The entity graph 1500 describes how a building is organized and how the different systems and spaces within the building relate to each other. For example, entity graph 1500 is shown to include an organization 1502, a space 1504, a system 1506, a point 1508, a time series 1510, and a data source 1512. The arrows interconnecting organization 1502, space 1504, system 1506, point 1508, time series 1510, and data source 1512 identify the relationships between such entities. In some embodiments, the relationships are stored as attributes of the entity described by the attribute.

Organization 1502 is shown to include a contains descendants attribute 1514, a parent ancestors attribute 1516, a contains attribute 1518, a parent attribute 1520, an occupies attribute 1524, an owns attribute 1530, a uses system attribute 1548, and a data source attribute 1580. The contains descendants attribute 1514 identifies any descendant entities contained within organization 1502. The parent ancestors attribute 1516 identifies any parent entities to organization 1502. The contains attribute 1518 identifies any other organizations contained within organization 1502. The asterisk alongside the contains attribute 1518 indicates that organization 1502 can contain any number of other organizations. The parent attribute 1520 identifies a parent organization within which organization 1502 associated with. The number 1 alongside the parent attribute 1520 indicates that organization 1502 can be associated with exactly one other parent organization. The occupies attribute 1526 identifies any spaces occupied by organization 1502. The asterisk alongside the occupies attribute 1526 indicates that organization 1502 can occupy any number of spaces. The owns attribute 1530 identifies any spaces owned by organization 1502. The asterisk alongside the owned attribute 1530 indicates that organization 1502 can own any number of spaces. The uses system attribute 1548 identifies systems used by organization 1502. The data source attribute 1580 identifies any data sources that are associated with organization 1502. The asterisk alongside the data source attribute 1580 indicates that any number of data sources can be associated with organization 1502.

Space 1504 is shown to include an occupied by ancestors attribute 1522, an occupied by attribute 1524, an owned by ancestors attribute 1525, an owned by attribute 1528, a contains space descendants attribute 1532, a located in ancestors attribute 1534, a contains spaces attribute 1536, a located in attribute 1538, a served by system descendants attribute 1540, a served by systems attribute 1546, and a points attribute 1560. The occupied by ancestors attribute 1522 identifies one or more ancestors to organization 1502 that are occupied by space 1504. The asterisk alongside the occupied by ancestors attribute 1522 indicates that space 1504 can be occupied by any number of ancestors. The occupied by attribute 1524 identifies an organization occupied by space 1504. The number 1 alongside the occupied by attribute 1524 indicates that space 1504 can be occupied by exactly one organization. The owned by ancestors attribute 1525 identifies one or more ancestors to organization 1502 that own space 1504. The asterisk alongside the owned by ancestors attribute 1525 indicates that space 1504 can be owned by any number of ancestors. The owned by attribute 1528 identifies an organization that owns space 1504. The number 1 alongside the owned by attribute 1528 indicates that space 1504 can be owned by exactly one organization.

The contains space descendants attribute 1532 identifies any descendants to space 1504 that are contained within space 1504. The located in ancestors attribute 1534 identifies any ancestors to space 1504 within which space 1504 is located. The contains spaces attribute 1536 identifies any other spaces contained within space 1504. The asterisk alongside the contains spaces attribute 1536 indicates that space 1504 can contain any number of other spaces. The located in attribute 1538 identifies another space within which space 1504 is located. The number 1 alongside the located in attribute 1538 indicates that space 1504 can be located in exactly one other space. The served by system descendants attribute 1540 identifies any descendent systems that serve space 1504. The asterisk alongside the served by descendant systems attribute 1540 indicates that space 1504 can be served by any number of descendant systems. The served by systems attribute 1546 identifies any systems that serve space 1504. The asterisk alongside the served by systems attribute 1546 indicates that space 1504 can be served by any number of systems. The points attribute 1560 identifies any data points that are associated with space 1504. The asterisk alongside the points attribute 1560 indicates that any number of data points can be associated with space 1504.

System 1506 is shown to include a serves space ancestors attribute 1542, a serves spaces attribute 1544, a subsystem descendants attribute 1550, a part of ancestors attribute 1552, a subsystems attribute 1554, a part of attribute 1556, a used by organization attribute 1582, a points attribute 1564, and a data source attribute 1572. The serves space ancestors attribute 1542 identifies any ancestors to space 1504 that are served by system 1506. The asterisk alongside the serves ancestor spaces attribute 1542 indicates that system 1506 can serve any number of ancestor spaces. The serves spaces attribute 1544 identifies any spaces that are served by system 1506. The asterisk alongside the serves spaces attribute 1544 indicates that system 1506 can serve any number of spaces. The used by organization attribute 1582 identifies systems used by the organization 1502. The asterisk alongside the used by organization attribute 1582 indicates system 1506 can be used by any number of organizations.

The subsystem descendants attribute 1550 identifies any subsystem descendants of other systems contained within system 1506. The part of ancestors attribute 1552 identifies any ancestors to system 1506 that system 1506 is part of. The subsystems attribute 1554 identifies any subsystems contained within system 1506. The asterisk alongside the subsystems attribute 1554 indicates that system 1506 can contain any number of subsystems. The part of attribute 1556 identifies any other systems that system 1506 is part of. The number 1 alongside the part of attribute 1556 indicates that system 1506 can be part of exactly one other system. The points attribute 1564 identifies any data points that are associated with system 1506. The asterisk alongside the points attribute 1564 indicates that any number of data points can be associated with system 1506. The data source attribute 1572 identifies any data sources that are associated with system 1506. The asterisk alongside the data source attribute 1572 indicates that any number of data sources can be associated with system 1506.

Time series 1510 is shown to include a point attribute 1568. The point attribute 1568 identifies a point that is associated with the time series 1510. The number 1 alongside the point attribute 1568 indicates exactly one point is associated with the time series 1510.

Point 1508 is shown to include a used by spaces attribute 1558, a used by systems attribute 1562, a time series attribute 1566, and a data source attribute 1576. The used by spaces attribute 1558 identifies data points used by space 1504. The asterisk alongside the used by spaces attribute 1558 indicates that point 1008 can be used by any number of spaces. The used by systems attribute 1562 identifies data points used by system 1506. The asterisk alongside the used by systems attribute 1562 indicates that point 1008 can be used by any number of systems. The time series attribute 1566 identifies a data point associated with time series 1510. The asterisk alongside the time series attribute 1566 indicates that point 1008 can be associated with any number of time series. The data source attribute 1576 identifies data points associated with data source 1512. The asterisk alongside the data source attribute 1576 indicates that point 1008 can be associated with any number of data sources.

Data source 1512 is shown to include a systems attribute 1570, a points attribute 1574, and an organizations attribute 1578. The systems attribute 1570 identifies systems associated with data source 1512. The asterisk next to systems attribute 1570 indicates that any number of systems can be associated with data source 1512. The points attribute 1574 identifies any data points that are associated with data source 1512. The asterisk alongside the points attribute 1574 indicates that any number of data points can be associated with data source 1512. The data source attribute 1580 identifies an organization associated with data source 1512. The number 1 next to organization attribute 1578 indicates that one organization can be associated with data source 1512.

Referring back to FIG. 14, time series API 1474 (e.g., having queryable streams 1476) is configured to display documentation for points, time series, samples, messages, and/or job endpoints. Time series API 1474 may facilitate displaying a sample for a single point and/or multiple points. A point may have a raw time series which has original samples. Other time series on the point may be rollups calculated based on the raw time series. The sum, average, and delta parameters (e.g., quarter hour, hourly, daily, monthly, yearly, etc.) may be used to select a time series. The uniform resource identifier (URI) parameters for one or more points is shown in Table 15.

TABLE 15

URI Parameters - Points

| Name | Description | Type |
|---|---|---|
| startTime | Optional. ISO8601 date format. If not specified all samples before the endTime are returned. | date |

TABLE 15-continued

URI Parameters - Points

| Name | Description | Type |
| --- | --- | --- |
| endTime | Optional. ISO8601 date format. If not specified all samples after startTime are returned. If neither startTime or endTime are specified, all samples are returned. | date |
| sum | Optional. Specifies the period to sum by. Possible values: quarterly (i.e. quarter hour), hourly, daily, monthly, yearly | string |
| average | Optional. Specifies the period to average by. Possible values: quarterly, hourly, daily, monthly, yearly | string |
| delta | Optional. Specifies the period to compute deltas by. Possible values: quarterly, hourly, daily, monthly, yearly | string |
| points | Required (if multiple). A comma separated list of point ids. | string |

Time series API 1474 may facilitate displaying, deleting, and/or receiving statistics of samples of one or more time series. The URI parameters for one or more time series is shown in Table 16.

TABLE 16

URI Parameters - Time series

| Name | Description | Type |
| --- | --- | --- |
| time seriesId | time series id to get | string |
| ids | optional list of addtional time series ids to get | Collection of string |
| startTime | Start Time (localtime + offset), default is UTC now minus 1 day | date |
| endTime | End Time (localtime + offset), default is UTC now | date |
| orderby | Supports ordering by timestamp. An optional ASC or DESC keyword sets the sort direction. | string |
| top | Limits the number of samples returned per time series. | integer |
| skip | Excludes the first n samples per time series. | Integer |
| convertedUnitsId | UnitsId of the units you want the sample values converted to. | string |

Time series API 1474 may also facilitate determining which samples have been cleansed. For example, when a point is created, an time series (e.g., with a transformation type of "is cleansed") is created for the point. The "is cleansed" time series stores samples at the timestamp when a sample triggered a cleanser to modify its data. The "is cleansed" time series is queried like any other time series object, and returns different values based on which cleanser was run on that sample. The cleanser may include a bounds limiting cleanser, an instantaneous consumption cleanser, an interpolate gap filler, and/or a data spike cleanser.

Job endpoints of the time series API 1474 may be used to interact with a job manager. According to an exemplary embodiment, the job manager is a background process in the time series API 1474 used to schedule jobs (e.g., repeatable jobs, etc.). A job may be an activity that interacts with time series data, such as collecting weather data, detecting faults, etc. When a job is run, the time series API 1474 is configured to create one or more tasks to perform the work. A job may include the parameters shown in Table 17. A user may use the time series API 1474 to return a list of registered job types, create a new job, get scheduled jobs, delete a scheduled job, get job history (e.g., scheduled jobs, running jobs, completed tasks, etc.), and get and set job manager settings (see Table 18).

TABLE 17

Job Parameters

| Name | Description | Type |
| --- | --- | --- |
| id | Job id | string |
| type | Registered job type | string |

TABLE 17-continued

Job Parameters

| Name | Description | Type |
| --- | --- | --- |
| next | UTC date time the job should run next | date time (ISO 8601) |
| interval | Time interval the job should repeat if null, the job doesn't repeat | timespan (ISO 8601 duration) |
| settings | Dictionary of key/value pairs used to customize the job | dictionary |

TABLE 18

Job Manager Settings

| Name | Description | Type |
| --- | --- | --- |
| taskWorkerCount | The number of threads processing tasks If set to zero the job manager will not run tasks | integer number |
| taskQueuePollingInterval | The interval the job manager waits before checking for new tasks | timespan |
| taskQueueCount | The number of tasks waiting to be run This value cannot be set | integer number |
| jobQueuePollingInterval | The interval the job manager waits before checking for new jobs | integer number |
| jobQueueCount | The number of jobs waiting to be run This value cannot be set | integer number |

By way of example, the time series API 1474 may run a job to collect weather related data from a service provider (e.g., accessed through the weather API 1470, etc.). The time series API 1474 may store the weather related data so that it may be queried. To activate this process, a weather station system may be added to a space through Entity API 1478. Prior to the weather station system being created, weather related points and a space to associate the weather station with may be identified and created. For example, a process may include (i) creating a space that the weather station may use, (ii) creating a weather point to store data against, and (iii) creating a weather station and connecting the weather point to the space.

After a weather station system is created, a weather collector job may be added to the job manager to initiate the data collection process. The first time the weather collector job runs it may try to determine a weather id for the weather station by using the latitude and longitude of the associated space to lookup up the closest weather id. Every time the weather job runs it may try to collect data missing since the last time it ran (e.g., based off of a timestamp of an outdoor air temperature point, etc.). In some embodiments, if no data is able to be found for a predetermined time frame (e.g., the last three years, etc.), the job will create a task for each month for the predetermined time frame to fill in the missing data. A weather report may then be generated on a desired, repeating basis (e.g., hourly, daily, etc.) and the weather related data is able to be queried like any other point (e.g., an operator can receive information relating to the current temperature at a desired location, etc.).

Referring still to FIG. 14, IoT hub 1420 may facilitate bi-directional communication between the cloud and devices in a secure, reliable, and uniform manner. As shown in FIG. 14, IoT hub 1420 includes a device registry module 1422, a metadata API 1424 (e.g., including device status, command feedbacks, etc.), an egress API 1426, and an ingress API 1428. The device registry module 1422 is configured to maintain a collection of credentials of devices (e.g., devices 1402, web/mobile devices 1406, etc.) that may be used to communicate with IoT Hub 1420. Each device may have two usable keys (e.g., a security key, a license key, etc.) that can be rotated as necessary. In some embodiments, the credentials (e.g., keys, etc.) are created and shared with the device at the time of manufacturing. In some embodiments, a device registry backdoor 1464 of Security API 1440 allows for the registration (e.g., assignment of credential/keys, etc.) post-manufacturing.

The egress API 1426 is configured to facilitate sending a message (e.g., a command message, etc.) from IoT hub 1420. The message may be used to issue a command to a device (e.g., device 1402, web/mobile device 1406, etc.) to take some action. Following receiving and processing the command, the device may respond with a message indicating whether the action is complete, rejected, or abandoned.

The ingress API 1428 is configured to facilitate receiving messages from a device (e.g., device 1402, web/mobile device 1406, etc.). The messages received from a device may include a device info message, a telemetry message, or still another message. The device info message may be used to define and/or update properties and/or supported commands for a device. The telemetry message may be used to record telemetry data for later retrieval and use. The telemetry data may be stored in time series API 1474.

Referring still to FIG. 14, notification API 1484 may be configured to communicate with external notification services 1486 (e.g., Azure notification hubs, etc.). Such communication may facilitate providing notifications to a device (e.g., device 1402, web/mobile devices 1406, etc.). Email API 1488 may be configured communicate with external email services 1490 (e.g., SendGrid, etc.). Such communication may facilitate providing emails to a device (e.g., device 1402, web/mobile devices 1406, etc.).

Device Registration

Figure 16:
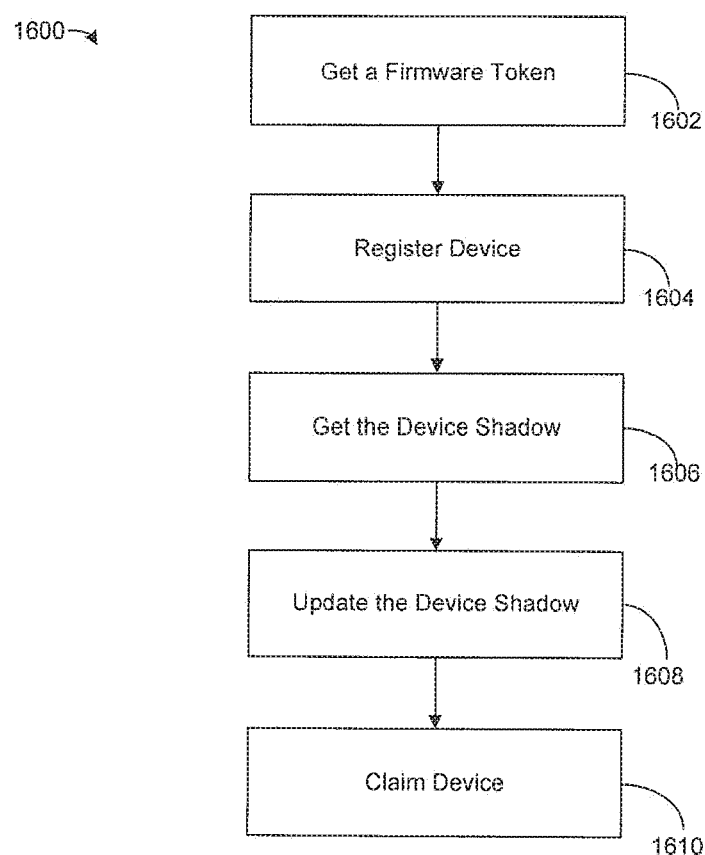
FIG. 16 is a flow chart illustrating a device registration process, according to some embodiments.

When a new device is introduced into an IoT environment, such as IoT environment 1100, described above, the device needs to be registered within IoT environment to ensure proper security and operation of the device within the IoT environment. As described above, devices incorporated into an IoT environment may include HVAC equipment 408, smart connected devices 1102, and the like. Turning now to FIG. 16, a process 1600 for registering a device within an IoT environment is shown, according to some embodiments. In one embodiment, the process 1600 may be associated with the device management technology concept 1108, described above. At process block 1602, a firmware token is obtained for the device to be registered. The firmware token may be used to authorize a request to register the device. The firmware tokens may further represent an identity of the device to be registered. For example, the firmware token may establish what permissions the device will have in the system. The firmware token may further establish one or more access levels of the device. In one embodiment, the firmware tokens may be stored in the token storage 1445 of the security API 1440.

In one embodiment, the firmware tokens represent a set of claims that can be used to restrict a client's (e.g. HVAC equipment 408, smart connected devices 1102, and the like) permissions when using secured systems. For example, the firmware tokens may restrict a client's permissions when using an IMS-secured endpoint, such as an HTTP API. Using the firmware tokens for a security model, as described above, can also be called a claims-based security model. Various claims are required to be included with the firmware tokens, but the firmware tokens can generally include any string of data as a claim. For example, a subject claim may be a consistent user ID. This claim may be available for all firmware tokens that are not user-less tokens. In some embodiments, the firmware tokens may be requires from an IMS by clients, which may then send the firmware tokens to an IMS-secured endpoint. In one embodiment, the firmware tokens may be sent to an IMS-secured endpoint using Bearer authorization in an HTTP Authorization header for HTTP-based APIs. In some embodiments, the firmware tokens may be time limited. For example, a firmware token may be good for one hour, although some firmware tokens may be available for more than one hour or less than one hour. In some embodiments, the firmware tokens are JSON Web Tokens (JWT). JWT use an open standard for encoding claims as a JSON object. The firmware tokens may provide an abstraction by replacing different authorization constructs (e.g. username and passwords, assertions, etc.) for a single token understood by a resource. This abstraction can enable issuing firmware tokens that are valid for a short time period.

At process block 1604, the new device may be registered with the IoT environment. In one embodiment, an API is used to register the device. For example, the application API 1460 may register the device. The application API 1460 may require the firmware token obtained at process block 1602. The application API 1460 may further require a unique device ID to be provided, that is associated with the new device to be registered. In one embodiment, the unique device ID is provided by the device manufacturer. For example, the unique device ID may be located on the device itself for reference. In one embodiment, the unique device ID is a media access control (MAC) address. In other embodiments, the unique device ID may be a device serial number, a device ID code, or other unique identifier. Once the proper authentication has been provided (e.g. the firmware token and the unique device ID), the device will be registered within a document database of the IoT environment associated with the security API 1440, such as via device storage 1446. The document database may contain a list of all devices registered within the IoT environment. In one embodiment, the document database is in an Azure® database from Microsoft®. Further, the SecurityAPI may generate a primary key and a secondary key upon the device being registered. The primary key may be used to claim the device, as described below.

Once the device is registered, a device shadow is generated at process block 1606. The device shadow may be a virtual representation of the physical device being registered. In one embodiment, the device shadow is a JSON blob that represents the physical device. The device shadow may allow for other devices within the IoT environment, either real or virtual, to read one or more data points associated with the device shadow. For example, the physical device may pass data point values to the device shadow to allow the data point values to be read by other devices in the IoT environment. In some embodiments, the other devices within the IoT environment may be able to write values to the device shadow. These values can then be passed to the physical device from the device shadow to allow for parameters to be changed within the physical device. In one embodiment, the device shadow is created based on a template associated with the particular device. For example, where the device is a sensor, the virtual device may be generated to have data points associated with a sensor, such as temperature data points where the sensor is a temperature sensor. In some embodiments, the templates may be standard templates stored within the IoT environment. In other embodiments, the templates may be provided by a manufacturer associated with the physical device. For example, once the unique device ID is known, the IoT environment may query a database associated with the manufacturer of the physical device to obtain a template associated with the physical device for use in generating the shadow device.

At process block 1608, the device shadow is updated. Updating the device shadow may include additional data points that may not have been included in the template used to generate the device shadow. For example, where the IoT environment generates the device shadow using a pre-existing template, some attributes and data points may not be included in the template depending on how specific the template is. As a more specific example, if the physical device being registered is a temperature sensor, the IoT environment may select a template associated with a standard temperature sensors. However, if the temperature sensors includes additional functionality, such as the ability to provide humidity data, this can be conveyed to the IoT environment, and the device shadow can be updated to reflect the additional data points. Thus, the pre-existing template may be compared to the attributes and data points of the physical device. In some embodiments, the attributes and data points associated with the physical device may be provided by a user. However, in some examples the physical device may broadcast specific attributes and data points to the data platform 1400, such as to the application API 1460.

Finally, at process block 1610, the physical device is claimed. Claiming the physical device allows for data collected by the physical device to be provided to a user view. Claiming the physical device may further allow for secure communications from a cloud-based server to the physical device. Claiming the device can further provide a user with the ability to link other services, such as an If This Then That (IFTTT) service to communicate with the physical device on behalf of the user. In one embodiment, the unique ID and the primary key generated at process block 1604 are used by the Security API 1440 to claim the device. In some embodiments, the Security API 1440 may require the unique ID, the primary key, and the firmware token used to register the device. In some embodiments the device is claimed via the claim device module 1452 within the identity API 1450.

Figure 17:
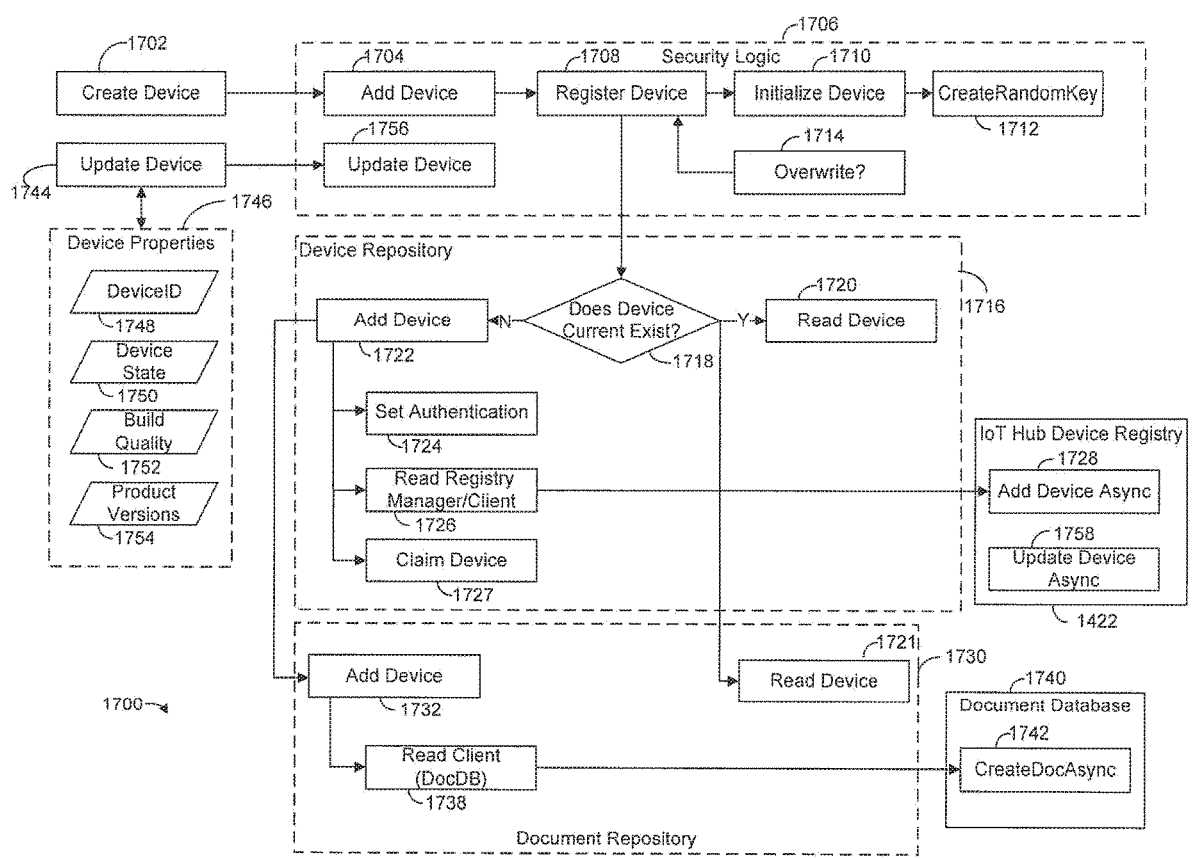
FIG. 17 is a flow chart illustrating a data flow associated with a device registration process, according to some embodiments.

Turning now to FIG. 17, a flow diagram illustrating the data flow 1700 during the physical device registration process 1600 is shown in detail. In some embodiments, the data flow 1700 is performed by the security, privacy, access control and compliance management technology concept 1190, or via data platform 1400 as described above. At process block 1702, a create device command is provided. The create device command can generate an add device instruction 1704 within a security logic API 1706. In some embodiments, the security logic API 1706 may be part of the security API 1440 described above. The security logic API 1706 may then issue a register device command at process block 1708. The register device command can cause an initialize device command to be generated by the security logic API 1706 at process block 1710. The initialize device command can provide a signal to the physical device to instruct the device to perform a necessary initialization processes. The initialization process may configure the physical device to fully communicate on one or more communication networks. Initializing the physical device may also include instructing the physical device to provide certain information to the IoT environment 1100 and/or the security logic API 1706. Once the device has been initialized, random keys can be created for the device at process block 1712, as described above. In one embodiment, a primary key and a secondary key may be generated at process block 1712. In other embodiments, the register device command may initiate an overwrite process at process block 1714 where the physical device being registered has previously been registered within the IoT environment 1100 and/or the data platform 1400. The overwrite process may replace the data current associated with a previously registered physical device with the newly registered physical device. In some embodiments, a user may be asked whether they want to override the previously registered physical device.

The register device command can further generate an add device command that is provided to a device repository 1716 (e.g. device storage 1446 of the data platform 1400) at process block 1718. Further at process block 1718, the device repository 1716 can determine if the new physical device currently exists in the repository. If the device currently exists, the associated shadow device can be read at process block 1720. In one embodiment, data points associated with the shadow device are read at process block 1722. Further, if the device is determined to currently exist at process block 1718, the document repository 1730 may read the shadow device at process block 1721. In a further embodiment, data points associated with the shadow device are read at process block 1721, by the document repository 1730. If the device is determined not to exist at process block 1718, an add device command is provided to the device repository 1716 at process block 1722. At process block 1724, a set authentication command can be issued to establish one or more authentication parameters associated with the physical device being registered. At process block 1726 a manager-client registry can be read. The manager-client registry may include relationships associated with one or more devices within IoT environment 1100. Thus, the device repository 1716 may determine what, if any, relationships are associated with the new physical device. Once the manager-client registry has been read, the device repository 1716 can provide an Add Device Async command to the device registry module 1422 within the IoT Hub 1420, at process block 1728. The Add Device Async command may register the device within the IoT Hub 1420, and thereby within the IOT environment 1100. At process block 1727, the device may be claimed.

The document repository 1730 may also receive an add device command at process block 1732. In some examples, the document repository received the add device command when it is determined that the device currently exists at process block 1718. In one embodiment, the document repository 1730 may be associated with the security API 1440. At process block 1738 a read client command is generated. The client command may read clients within the IoT environment which may be associated with the new physical device. A document associated with the new physical device may be created in a document database 1740 at process block 1742. The document database 1740 may contain a list of all devices registered within the IoT environment. In one embodiment, the document database 1740 is in an Azure® database from Microsoft™.

At process block 1744, an update device command may be received by the data platform 1400. The update device command may update a registered physical device in the IoT environment 1100 with one or more device properties 1746. The one or more device properties can include a device ID 1748, a device state 1750, a build quality 1752, a product version 1754, or other properties associated with the physical device. The properties of the registered physical device can then be updated at process block 1756 within the security logic API 1706. Finally, the registered physical device may then be updated within the device registry module 1422 at process block 1758.

Figure 18:
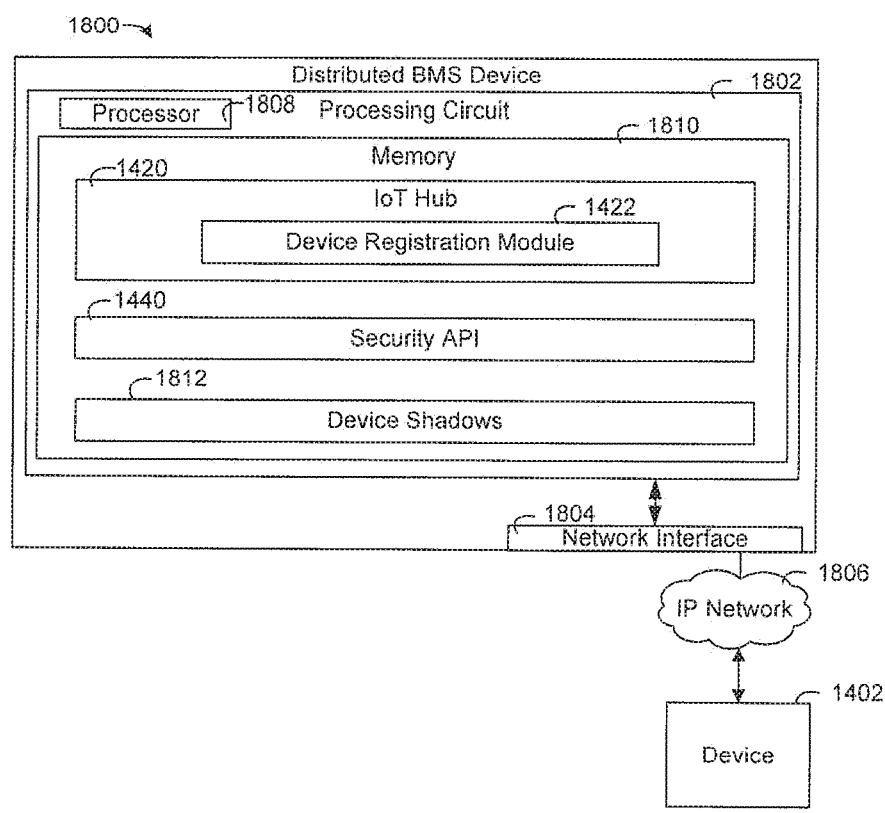
FIG. 18 is a block diagram illustrating a distributed BMS device, according to some embodiments.

Turning now to FIG. 18, a block diagram illustrating a distributed BMS device 1800 is shown, according to some embodiments. The distributed BMS device 1800 can be a smart connected device 1102 or an HVAC equipment 408 as described above. The distributed BMS device 1800 may further be a gateway 1128. In some embodiments, the distributed BMS device 1800 may be a virtual device on a cloud-based server (e.g. cloud-based server 1210). In other embodiments, the distributed BMS device 1800 may be a service provided by a cloud-based server. The distributed BMS device 1800 may include a processing circuit 1802 and a network interface 1804.

The network interface 1804 can allow the distributed BMS device 1800 to communicate with an IP network 1806. In some embodiments, the network interface 1804 can communicate with the HP network 1806 and one or more other non-IP networks (e.g. BACnet). The network interface 1804 may be or include wired or wireless communications interfaces (e.g., jacks, antennas, transmitters, receivers, transceivers, wire terminals, etc.) for conducting data communications with the IP network 1806. In various embodiments, communications via the network interface 1804 can be direct (e.g., local wired or wireless communications) or via a communications network (e.g., a WAN, the Internet, a cellular network, etc.). For example, the network interface 1804 can include an Ethernet card and port for sending and receiving data via an Ethernet-based communications link or network. In another example, the network interface 1804 can include a Wi-Fi transceiver for communicating via a wireless communications network. In another example, the network interface 1804 can include cellular or mobile phone communications transceivers. In one embodiment, the network interface 1804 is a power line communications interface. In other embodiments, the network interface 1804 is an Ethernet interface. The network interface 1804 may allow the distributed BMS device 1800 to communicate with a device 1402, as described above.

The processing circuit 1802 is shown to include a processor 1808 and a memory 1810. The processor 1808 may be a general purpose or specific purpose processor, an application specific integrated circuit (ASIC), one or more field programmable gate arrays (FPGAs), a group of processing components, or other suitable processing components. The processor 1808 may be configured to execute computer code or instructions stored in memory 1810 or received from other computer readable media (e.g., CDROM, network storage, a remote server, etc.).

Memory 1810 may include one or more devices (e.g., memory units, memory devices, storage devices, etc.) for storing data and/or computer code for completing and/or facilitating the various processes described in the present disclosure. Memory 1810 may include random access memory (RAM), read-only memory (ROM), hard drive storage, temporary storage, non-volatile memory, flash memory, optical memory, or any other suitable memory for storing software objects and/or computer instructions. Memory 1810 may include database components, object code components, script components, or any other type of information structure for supporting the various activities and information structures described in the present disclosure. Memory 1810 may be communicably connected to the processor 1808 via processing circuit 1802 and may include computer code for executing (e.g., by processor 1808) one or more processes described herein. For example, the memory 1810 may be contain executable code for the device registration process 1600 described above.

The memory 1810 may include an IoT hub, such as IoT hub 1420. The IoT hub 1420 may include device registry module 1422. The device registration module 1422 can perform the device registration process 1600 described above. As described above, the device registry module 1422 may serve as a device registration service for registering devices in a distributed BMS system. In one embodiment, the device registry module 1422 may be in communication with the security API 1440 to access one or more modules associated with the security API 1440, such as the device storage 1446 and the token storage 1445 for purposes of performing the device registration process 1600. The memory 1810 may further include a device shadows module 1812. The device shadows module 1812 may store one or more device shadows associated with HVAC devices in a distributed BMS, such as the device 1402. While not shown, it is contemplated that the memory 1810 may include some or all of the elements of the data platform 1400, described above. In some embodiments, there may be multiple distributed BMS devices in a distributed BMS, and the elements of data platform 1400 may be distributed among several BMS devices in a distributed BMS, such as system 408. For purposes of this disclosure, the terms distributed BMS and IoT environment should be understood to be interchangeable.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for registering a heating, ventilation or air conditioning (HVAC) device in a building management system (BMS), the method comprising:
   obtaining a firmware token for the HVAC device at a registration service, wherein the firmware token establishes one or more permissions of the HVAC device;
   authorizing the registration of the HVAC device using the firmware token;
   registering the HVAC device into a database of the registration service using a unique device identifier;
   determining credentials associated with the HVAC device in the database of the registration service based on the one or more permissions of the HVAC device established by the firmware token;
   providing the credentials to the HVAC device for operation of the HVAC device in accordance with the one or more permissions;
   generating a device shadow based on a device template and a role of the HVAC device, the role representing the one or more permissions of the HVAC device established by the firmware token, the device template comprising one or more data points associated with the HVAC device, wherein the device shadow provides a virtual representation of the HVAC device within the BMS; and
   at least one of (i) reading, by a second device of the BMS, values of the one or more data points from the device shadow or (ii) writing, by the second BMS device, the values of the one or more data points to the device shadow.

2. The method of claim 1, wherein the device template is associated with the unique device identifier.

3. The method of claim 1, wherein the registration service is implemented using one or more cloud-based servers.

4. The method of claim 1, further comprising comparing the one or more data points of the device template against one or more data points of the HVAC device and updating the device shadow with at least one data point of the HVAC device that is different from a data point of the device template.

5. The method of claim 1, wherein the firmware token is only valid for a defined time period.

6. The method of claim 1, further comprising claiming, by a user, the HVAC device, wherein claiming the HVAC device allows the user to manage the HVAC device within the BMS.

7. The method of claim 1, wherein the one or more permissions of the HVAC device comprise one or more features accessible by the HVAC device.

8. The method of claim 1, wherein the HVAC device is configured to transmit time series data to the BMS upon the registration of the HVAC device.

9. A building management system (BMS), the system comprising:
   a distributed BMS device comprising a processor, the processor configured to:
      obtain a firmware token for a heating, ventilation or air conditioning (HVAC) device at a registration service, wherein the firmware token establishes one or more permissions of the HVAC device;
      register the HVAC device into a database of the registration service using a unique device identifier;
      determine credentials associated with the HVAC device in the database of the registration service based on the one or more permissions of the HVAC device established by the firmware token;
      provide the credentials to the HVAC device for operation of the HVAC device in accordance with the one or more permissions;
      generate a device shadow based on a device template and a role of the HVAC device, the role representing the one or more permissions of the HVAC device established by the firmware token, the device template comprising one or more data points associated with the HVAC device, the device shadow providing a virtual representation of the HVAC device within the BMS; and at least one of (i) read, by a second device of the BMS, values of the one or more data points from the device shadow or (ii) write, by the second BMS device, the values of the one or more data points to the device shadow.

10. The system of claim 9, wherein the device template is associated with the unique device identifier.

11. The system of claim 10, wherein the device template is based on a device type of the HVAC device that is determined using the unique device identifier.

12. The system of claim 9, wherein the processor is further configured to compare data points of the device shadow against one or more data points of the HVAC device.

13. The system of claim 12, wherein the processor is further configured to update the device shadow with the data points of the HVAC device that are different from data points of the device shadow.

14. The system of claim 9, wherein the HVAC device is claimed by a user, and wherein claiming the HVAC device allows the user to manage the HVAC device within the BMS.

15. The system of claim 9, wherein the one or more permissions of the HVAC device comprise one or more features accessible by the HVAC device.

16. The system of claim 9, wherein the unique device ID is one of a media access control address and a serial number of the HVAC device, and wherein the HVAC device is configured to transmit time series data to the BMS upon the registration of the HVAC device.

17. The system of claim 9, wherein the distributed BMS device is one of a controller and a cloud-based server.

18. A method for registering an Internet of Things (IoT) heating, ventilation or air conditioning (HVAC) device in a building management system (BMS), the method comprising:

obtaining a firmware token for the IoT HVAC device at a registration service, wherein the firmware token establishes one or more permissions of the IoT HVAC device;

authorizing the registration of the IoT HVAC device using the firmware token;

registering the IoT HVAC device into a database of the registration service using a unique device identifier;

determining credentials associated with the IoT HVAC device in the database of the registration service based on the one or more permissions of the IoT HVAC device established by the firmware token;

providing the credentials to the IoT HVAC device for operation of the IoT HVAC device in accordance with the one or more permissions;

claiming, by a user, the IoT HVAC device, wherein claiming the IoT HVAC device allows the user to manage the IoT HVAC device within the BMS;

generating a device shadow based on a device template and a role of the IoT HVAC device, the role representing the one or more permissions of the IoT HVAC device established by the firmware token, the device template comprising one or more data points associated with the IoT HVAC device, wherein the device shadow provides a virtual representation of the IoT HVAC device within the BMS; and passing values of the one or more data points from the device shadow to the IoT HVAC device to change one or more parameters within the IoT HVAC device.

19. The method of claim 18, wherein the device template is associated with the unique device identifier.

20. The method of claim 18, further comprising:

comparing the data points of the device shadow against one or more data points of the IoT HVAC device; and updating the device shadow with the data points of the IoT HVAC device that are different from data points of the device shadow.

* * * * *